(12) United States Patent
Weaver et al.

(10) Patent No.: US 11,836,397 B2
(45) Date of Patent: Dec. 5, 2023

(54) SYSTEM AND METHOD FOR TRACKING PRODUCTION LINE PRODUCTIVITY WITH AN INDUSTRIAL PRINTER

(71) Applicant: VIDEOJET TECHNOLOGIES INC., Wood Dale, IL (US)

(72) Inventors: Robert V. Weaver, Sandy Springs, GA (US); Robert K. Neagle, Algonquin, IL (US); Randy Fischer, Flowery Branch, GA (US)

(*) Notice: Subject to any disclaimer, the term of this patent is extended or adjusted under 35 U.S.C. 154(b) by 449 days.

(21) Appl. No.: 17/046,238

(22) PCT Filed: Apr. 8, 2019

(86) PCT No.: PCT/US2019/026337
§ 371 (c)(1),
(2) Date: Oct. 8, 2020

(87) PCT Pub. No.: WO2019/199674
PCT Pub. Date: Oct. 17, 2019

(65) Prior Publication Data
US 2021/0109690 A1    Apr. 15, 2021

Related U.S. Application Data

(60) Provisional application No. 62/654,886, filed on Apr. 9, 2018.

(51) Int. Cl.
G06F 3/12    (2006.01)
(52) U.S. Cl.
CPC .......... *G06F 3/1207* (2013.01); *G06F 3/1229* (2013.01); *G06F 3/1259* (2013.01); *G06F 3/1282* (2013.01)

(58) Field of Classification Search
CPC .... G06F 3/1207; G06F 3/1229; G06F 3/1259; G06F 3/1282; Y02P 90/80
See application file for complete search history.

(56) References Cited

U.S. PATENT DOCUMENTS 5,841,658 A    11/1998 Bouchard
9,524,570 B1*  12/2016 Callaghan ............. G06T 11/206
(Continued)

FOREIGN PATENT DOCUMENTS

EP    0258495 B1    10/1994

OTHER PUBLICATIONS

EP Application No. 19784972.2, Extended Search Report, dated Dec. 6, 2021, 8 pages.
(Continued)

*Primary Examiner* — John R Wallace
(74) *Attorney, Agent, or Firm* — Wolter Van Dyke Davis, PLLC; Robert L. Wolter

(57) ABSTRACT

A method and system for operating an industrial printer includes obtaining initial data that indicates the industrial printer used on a production line at a facility and a product to be output. Target data is obtained indicating target start time and target number of the product and target duration. The industrial printer is operated to report a count of print operations for the product at regular time intervals. Actual data is stored indicating the count and the time interval. Upon a condition, a line report is determined based on the count and the target data. The line report is presented on a display device. The condition is one or more of passage of the target duration after the target start time, passage of the target duration after a first print operation, a change in shift workers on the production line, a time of day, and a predetermined event.

23 Claims, 20 Drawing Sheets

(56) References Cited

U.S. PATENT DOCUMENTS

| | | |
|---|---|---|
| 2003/0056869 A1* | 3/2003 | Tate .......................... B65C 9/42 |
| | | 156/64 |
| 2003/0154144 A1 | 8/2003 | Pokorny et al. |
| 2003/0176942 A1* | 9/2003 | Sleep ..................... G06V 20/66 |
| | | 700/213 |
| 2004/0153190 A1* | 8/2004 | Zhang .................. G06Q 10/087 |
| | | 700/106 |
| 2005/0000842 A1 | 1/2005 | Timmerman |
| 2008/0186528 A1 | 8/2008 | Doose et al. |
| 2011/0307095 A1* | 12/2011 | Chretinat .............. B41F 33/025 |
| | | 700/214 |
| 2012/0243030 A1* | 9/2012 | Graf ....................... G06Q 10/06 |
| | | 358/1.15 |
| 2012/0288312 A1 | 11/2012 | Seki |

OTHER PUBLICATIONS

PCT/US19/26337 International Search Report and Written Opinion, dated Jul. 11, 2019, 12 pages.

\* cited by examiner

FIG. 13A

Inspection Management

Create an Inspection

Product Info

Inspection Name                             Required ▽

Product Name

Inspection Description

Product Description

Add Inspection Activity

1. Verify Code
2. Verify Label Placement
3. Verify Temperature
4. Add new activity Inspection Frequency [  ] Mins.

Line [✓]    Product [ ]

Lines | 12 Oz. Can Line × | 16 Oz. PET Line × | Liter Line ×
Liter Line
Non-Carbonated Line
12 Oz. Can Line
2 Liter Line
16 Oz. PET Line User Intelligence
- Performance
- Reports
- Slides
- Setup Design: Job Template Management
- Design
- Download Manage Printer Performance
- VRS
- Workflow Portal + D2

TASKS          100%

Inspection

12 Oz. Can Line – Inspection set A

February 12, 2019 – 13:10 Inspection Cycle

|    | | Pass | Fail | | | |
|----|---|---|---|---|---|---|
| 1. | Verify Code | ☐ | ☐ | View Reference | Add Comment | Add Image |
| 2. | Verify Label Placement | ☐ | ☐ | View Reference | Add Comment | Add Image |
| 3. | Verify Temperature | ☐ | ☐ | View Reference | Add Comment | Add Image |
| 4. | Verify Weight | ☐ | ☐ | View Reference | Add Comment | Add Image |

Save     Cancel

FIG. 13B

SYSTEM AND METHOD FOR TRACKING PRODUCTION LINE PRODUCTIVITY WITH AN INDUSTRIAL PRINTER

BACKGROUND

Industrial printers, such as continuous inkjet printers, are used in production line printing to mark products or product packaging with information related to the product. These printers are sophisticated devices with many components. For example, some components charge an ink mixture, called a makeup fluid, and other components apply electric fields in order to control movement of droplets of the makeup fluid to form desired patterns on the product or product packaging.

As described in World Intellectual Property Organization (WIPO) publication WO 2016/057465 for a particular intelligent industrial printer system, these printers may include various sensors to monitor sensor values associated with one or more components of the printer. For example, sensors at the print head may be used to monitor the temperature at the print head or monitor the temperature of components of the print head. Temperatures exceeding a desired print head temperature may result in over consumption of solvent which directly affects the viscosity of the ink. To that end, sensors may be provided at the ink supply of the printer to monitor the viscosity of the ink. In addition, ink level sensing means may be provided to monitor the level of ink remaining in an ink supply tank or an ink make-up tank. Additionally, a printer controller may be configured to generate alerts or warnings based sensor values generated by the sensors. In addition, user interface data or event data is generated for some printers. For example, user interface data may include print enable/print disable data, which may include the date and time a printer was enabled and then subsequently disabled by an operator, or the date and time of one or more print head cleaning operations. Other data used by some industrial printers include values for user set parameters, such as production line speed, image height and width, distance a substrate is from a print head, and actual print head temperature

SUMMARY

It is here noted that intelligent industrial printers, such as described in WIPO publication WO 2016/057465, can serve as indicators of production line productivity. As used herein, production line means any series of activities during the manufacture or packaging or shipping of items, including assembly lines in the manufacturing process and Fast Moving Consumer Packaged Good (FMCPG) environments. For example, such printers can be operated so that data from such printers can be used to determine overall equipment effectiveness (OEE) of a production line. OEE takes into account the various sub components of the manufacturing process—Availability, Performance and Quality. After the various factors are taken into account the result is expressed as a percentage. Therefore, techniques are provided for tracking production line productivity with an industrial printer. This approach leverages equipment a user already has installed, without challenging configuration and setup, to gain transparency into production line operation that enables increases in production throughput and reduces operating costs.

In a first set of embodiments, a method includes obtaining initialization data that indicates a representative industrial printer used on a production line at a facility and a product to be output by the production line. The method also includes obtaining target data that indicates a target start time and a target number of the product and a target duration for producing the target number of the product. The method further includes operating the representative industrial printer to report (e.g., send a report message including) at regular time intervals a count of print operations for the product. Still further, the method includes storing production line data that indicates the count of print operations and the time interval. Yet further, the method includes, upon a condition precedent, determining a production line report that indicates productivity of the production line based on the count of print operations and the target data, and presenting the line report on a display device. The condition precedent is one or more of a group including: passage of the target duration after the target start time; passage of the target duration after a first print operation for the product; a change in shift workers on the production line; a time of day; and occurrence of a predetermined event.

In some embodiments of the first set, the method still further includes presenting a user interface configured to receive an event code indicating at least one of: filler down; printer down; awaiting product; awaiting raw material; planned maintenance; and, quality assurance hold. In these embodiments, the occurrence of the predetermined event includes receiving a report of the event code.

In some embodiments of the first set, an event code is produced automatically based on a different one or more sensors in the industrial printer than produces the count of print operations, wherein the event code indicates a printer condition or event associated with production down time for at least one of the representative printer or a different printer on the production line and storing the production line data includes storing the event code produced automatically.

In some embodiments of the first set, the method still further includes presenting a user interface configured to receive label input data that indicates a change in a label for observed downtime between a label of scheduled downtime and a label of unscheduled downtime.

In some embodiments of the first set, the method still further includes presenting an inspection user interface configured to receive inspection data based on manual input provided by an inspector and storing on a computer-readable medium the inspection data.

In some embodiments of the first set, the method further includes receiving over communication lines from a separate sensor that is not part of the industrial printer, separate data that indicates a count of products on the production line. Storing production line data further comprises storing supplemental data based on the separate data from the separate sensor.

In some embodiments of the first set, the processor includes one or more of a group of processors comprising: a processor on the representative industrial printer; a processor on a network confined to the facility; and a processor on a remote server outside the facility.

In a second set of embodiments, a system includes a production line at a facility; a processor; a display device; and, an industrial printer configured to label a package on the production line. The industrial printer is in communication with the processor. The system also includes at least one memory including one or more sequences of instructions, the at least one memory and the one or more sequences of instructions configured to, with the at least one processor, cause the system to perform at least the following. The system operates the representative industrial printer to report a count of print operations for the product at a plurality of time intervals. Upon a condition precedent, the system determines a line report that indicates productivity of the production line based at least in part on the count of print operations. The system presents the line report on the display device.

In other sets of embodiments, a computer-readable medium or apparatus is configured to perform one or more steps of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13A and FIG. 13B are block diagrams that illustrate example screens for reporting product inspections, according to an embodiment;

DETAILED DESCRIPTION

Figure 1A:
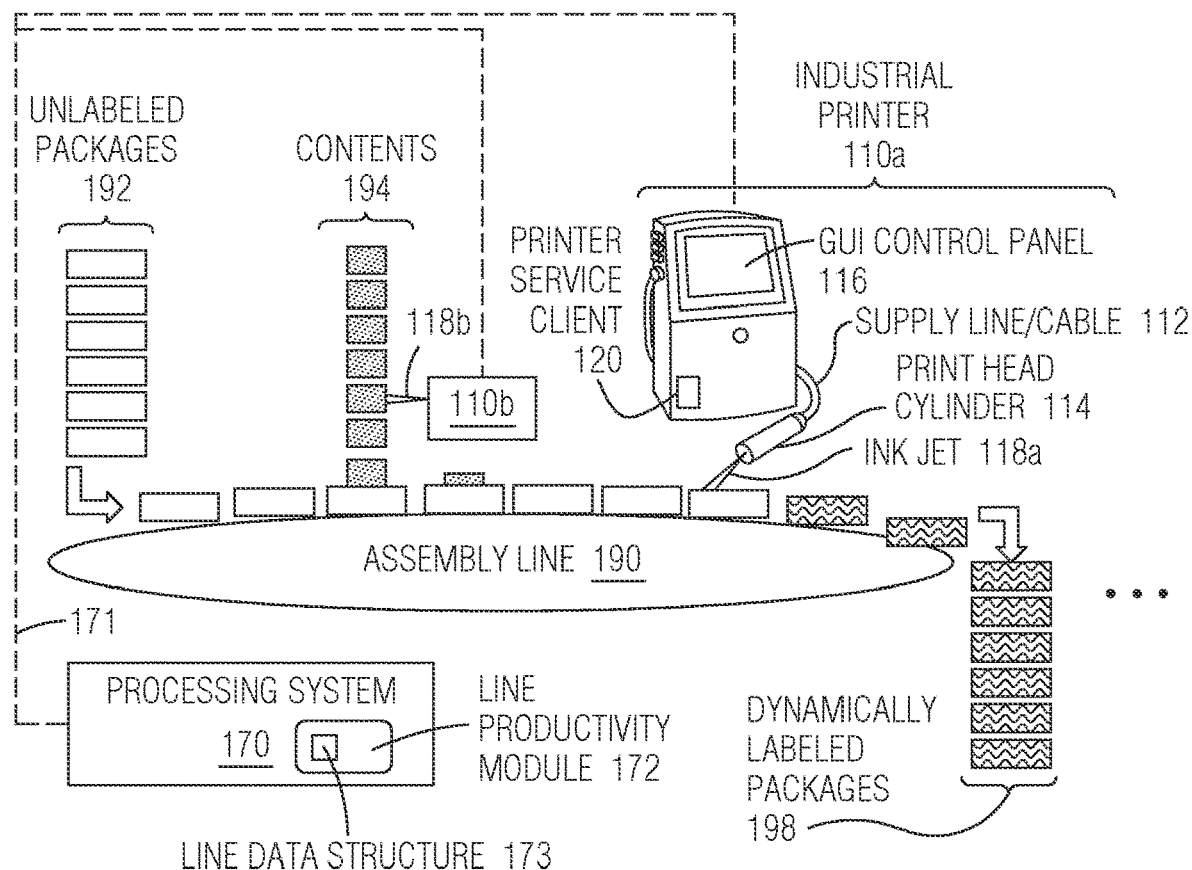
FIG. 1A is a block diagram that illustrates an example production line with industrial printers, according to an embodiment.

A method and apparatus are described for remote operation of an industrial printer for production line production measurement. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4

Some embodiments of the invention are described below in the context of services provided by one entity (e.g., a manufacturer, re-seller or retailer of industrial printers) for many other entities, e.g., different companies that are each customers and users of the industrial printer and that are remote from the service provider. However, the invention is not limited to this context. For example, in some embodiments one entity owns many printers at one or more facilities, and the service is provided from a service center within one facility that has many printers by the same entity that uses the printers; or, the service is provided across several separated facilities that each has one or more industrial printers, by the same entity that uses the printers. In some embodiments, one entity provides a service center for many other entities that each have their own service center, e.g., with a stock of spare parts or spare printers or one or more knowledgeable technicians, or some combination. In various embodiments, ink jet printers are illustrated; but the methods are not limited to ink jet printers. In other embodiments other smart industrial printing or marking equipment is used, such as equipment for laser etching, laser charging.

1. Overview

FIG. 1A is a block diagram that illustrates an example production line 190 with industrial printer, according to an embodiment. Industrial printers include ink jet printer 110a, and other printers or marking equipment indicated by item 110b and ellipsis, collectively referenced as industrial printers 110. Unlabeled packages 192 enter the production line and receive contents 194. Upon sealing, industrial printer 110a directs an ink jet 118 onto the package which exits the production line as a stack or palette or other collection of dynamically labeled sealed packages 198. In other embodiments, the steps are performed in a different order, e.g., the package 192 is labeled by printer 110 before loading in the contents 194; or, the contents 194 are labeled directly, and the package 192 is omitted. In other embodiments, printer 110a labels the package and a different printer 110b labels the contents, or other printers indicated by ellipsis mark other component parts of contents 194, or palettes of multiple packages, or some combination. If the printer 110 fails, or the labels applied are incorrect, then the production line 190 is halted until a fix is achieved, reducing productivity of the line 190. Furthermore, if the label is incorrect, one or more labeled packages 198 have to be discarded, adding losses and further damaging productivity of the facility where the line 190 is located. If the production line or a component thereof halts, then a sensor on a printer 110 detects the lack of a substrate for printing; and, the printer 110 does not execute a print operation.

As shown in FIG. 1A for printer 110a, a print head cylinder 114 is directed to the packages; and, is fed by a supply line 112 from the body of the printer 110 in which one or more ink or makeup reservoirs are housed. The printer has a control panel (such as graphical user interface, GUI, control panel 116) to receive commands from a user. In some embodiments, all or part of the GUI 116 is implemented on a separate mobile terminal, such as a tablet or smart phone, as depicted in FIG. 12. Some printers, such as continuous ink printer model 1510 from Videojet Technologies Inc. of Wood Dale, Illinois, includes one or more processors, configured to perform one or more software or firmware-controlled processes. Such processors are often part of a chip set, as described in more detail below with reference to FIG. 11.

In the illustrated embodiment, the printer 110a is configured to perform a printer service client process 120, which allows control of the printer 110 based on data exchanged with a remote processor on processing system 170 via wired or wireless communications lines 171, as described in more detail with reference to some following figures. Often, the remote processor is another chip set as described with reference to FIG. 11, or a computer or computer systems as described in more detail below with reference to FIG. 10. The remote processing system 170 includes a production line productivity module 172 configured to perform one or more steps of a production line productivity method, described in more detail below with reference to FIG. 3. The module includes a production line data structure 173, described in more detail below with reference to FIG. 2.

In some embodiments, a separate sensor 178, also in communication via lines 171 with processing system 170, also makes measurements that indicate count of items produced by production line 190, whether on the same production line as printer 110a or on a different production line.

Figure 1B:
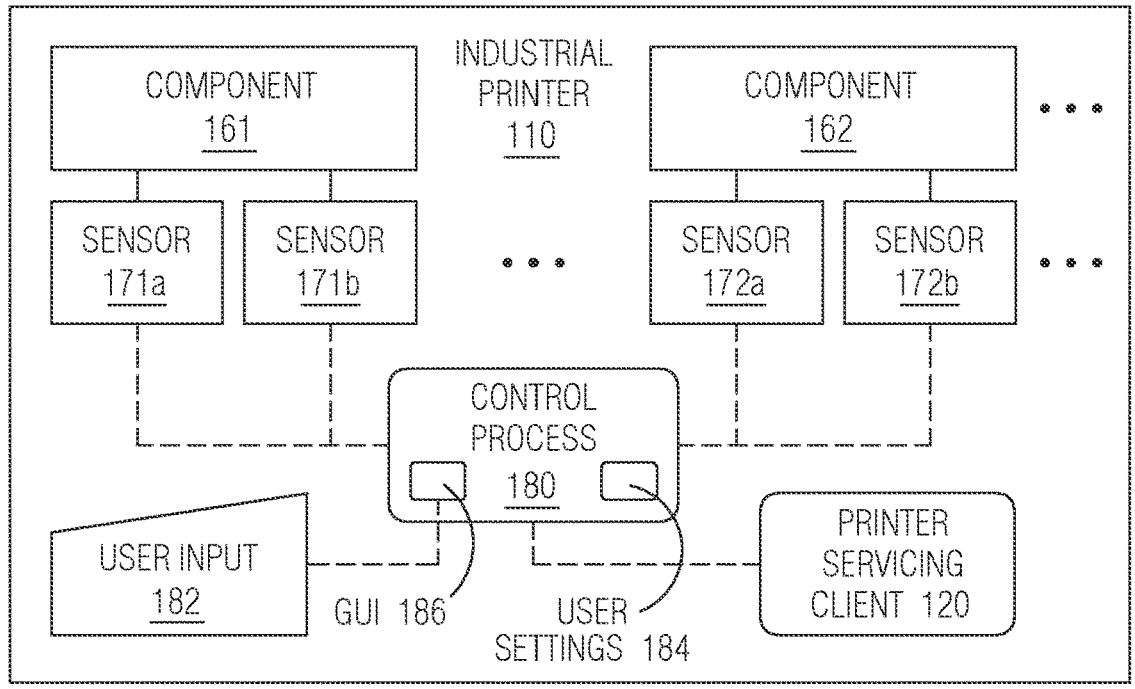
FIG. 1B is a block diagram that illustrates example components and sensors in an industrial printer, according to an embodiment.

FIG. 1B is a block diagram that illustrates example components and sensors in an industrial printer 110, according to an embodiment. The printer 110 includes printer component 161, printer component 162 and others indicate by ellipsis (collectively referenced hereinafter as printer components, 160). Each printer component 160 has associated zero or more sensors (collectively referenced hereinafter as sensors 165), each configured to measure a physical phenomenon associated with the printer component. As illustrated, printer component 161 has associated sensor 163a, sensor 163b among others indicated by ellipsis; and, printer component 162 has associated sensor 164a, sensor 164b among others indicated by ellipsis. For example, in some embodiments, a nozzle component has a temperature sensor, a jet velocity sensor, a pressure sensor, a modulation voltage sensor, a modulation current sensor and a modulation frequency sensor. Other example printer components and associated sensors for continuous ink printers are possible.

For example, there may be various sensors for various components in the printhead, ink system, consumables, and electronics. These sensors provide information on parameters related to the corresponding component. The combined information from the various sensors from various components provide unprecedented amounts of information on the status of various systems in the printer to allow a remote user to diagnose and predict potential issues, such as faults, warning, or failures, with the printer. A senor, such as a photocell or a mechanical arm or roller, or some combination, is included to detect a substrate or distance along a substrate (e.g., for an extruded product like cable or piping) on which to apply the label. Absent detection of the substrate or distance along the substrate, the printer will not perform a print operation.

The printhead may include a nozzle with sensor parameters such as the modulation voltage setpoint, modulation current, frequency, temperature, jet velocity setpoint, actual velocity, target pressure, temperature-compensated target pressure, and actual pressure; phase sensor parameters including selected phase, phase rate of change, profile, and phase threshold; EHT parameters such as voltage, current, trip value, and % of trip; gutter parameters such as build up, time since last clean, warning level setting, and presence of ink in gutter; printhead heater parameters such as set temperature, actual temperature, and drive; printhead cover parameters such as status (on or off) and time since last removed; the status of various printhead valves (open, closed, and time open or closed); nozzle parameters such as nozzle size, target velocity, serial number, manufacture date, drop frequency, print count, run hours, and drops deflected. Of these, print count is used in various embodiments to monitor production line productivity, at least in part.

The ink system may include sensor parameters such as ink pump parameters such as pressure, speed, current, and pump run hours; ink reservoir parameters such as ink type, ink expiry date, fluid level (ml and/or %), print hours remaining, and ink tank temperature; make up reservoir parameters such as make up type, expiry date, makeup vacuum, fluid level (ml and/or %), print hours remaining, and makeup tank temp; viscometer parameters such as target time to empty, actual time to empty, density, viscosity, and fill time; ink quality parameters such as ink conductivity; condenser parameters such as status (on or off), temperature, and vent valve (on or off); filter/damper module parameters such as ink filter pressure drop, serial number, manufacture date, run hours, and replacement date; service module parameters such as flush pump speed, flush pump current, serial number, manufacture date, run hours, replacement date, and information for various service module valves (open, closed, and time open or closed); ink cartridge parameters such as ink type, recommended make up type, serial number, manufacture date, expiry date, cartridge size, fluid level, run elapsed time, time to cartridge replacement, number of cartridge insertions, viscosity coefficient(s), fluid density, modulation algorithm numbers, and cold start algorithm numbers; make up cartridge parameters such as makeup type, serial number, manufacture date, expiry date, cartridge size, fluid level, run elapsed time, time to cartridge replacement, and number of insertions.

Other printer parameters include air filter parameters such as date last replaced, run hours, and replacement date; fume/gas sensors within the printer cabinet; humidity sensors within the printer or for ambient measurement; main control board parameters such as time and date, electronics temperature, HV voltage, HV Current, and the voltage of various other power supplies within the electronics.

Failures in any of these components or sensor may lead to a stop or slowdown in the production line 190. In some embodiments, such faults that lead to production line downtime are recorded as a downtime label. Data is transferred from the sensors 165 to a control process 180, such as a control software program running on a processor of the industrial printer 110, as indicated by dotted lines. The illustrated process 180 presents a graphical user interface GUI 186 for receiving user input 182, including values for user-set parameters or selections of a printer operation, such as a quick clean operation, or some combination. The values for the user-set parameters are stored in a user settings data structure 184.

Based on the sensor data or the printer operations selected by the user, or the user settings 184, or some combination, the control process 180 is configured to issue a fault (e.g., that a component is not working, or is not working properly), if appropriate; or, issue a warning (e.g., that a sensor indicates a measured value is approaching a value outside the normal range for the corresponding component), if appropriate. The fault or warning is displayed in a user interface, such as GUI 186. Example faults and warnings include some or all those listed in Table 1, among others.

TABLE 1

Example fault and warning events for an industrial printer.
Faults and Warnings

| | |
|---|---|
| Charge Error | Leveler ROR Low |
| EHT Trip | Leveler ROR Middle |
| Gutter Fault | Leveler ROR High |
| No Time To Phase | Gutter ROR |
| Ink System Service Soon (10% left) | Product Delay Too Short |
| Ink System Service Soon (5% left) | Line Too Fast Latched, Product Delay Too Short |
| Ink System Service Soon (2% left) | Print Overlap Latched, Inter-Print Gap Too Short |
| Ink Core Service Soon (0.5% left) | Too Often Latched |
| Ink System Service Overdue | Error Opening Log |
| Missed Print Turn Jet On | No USB Stick |
| Missed Print Enable Print | Error Writing to Log |
| No Time For Time of Flight (TOF) | Configs Ready |
| Bad Nozzle | Printhead On |
| Mixer Empty | Printing |
| Pump Fault | Service Mode |
| Elect Too Hot | Test Print Mode |
| Cabinet Too Hot | Default Mode |
| Mixer Empty | Pressure Stable |
| No Viscosity Control | Temperature Stable |
| Green Light ON | Clean Start |
| Yellow Light ON | Clean Stop |
| Red Light ON | Quick Start |
| No Phase Data From PE | Quick Stop |
| No Phase at Low Threshold | System Flush Purge |
| No Phase at High Threshold | Nozzle Flush |
| Bad Phasing | Umbilical Purge |
| Bad Phase No Frequency Adjust | System Fill |

TABLE 1-continued

Example fault and warning events for an industrial printer.
Faults and Warnings

| | |
|---|---|
| No Good Phase Start | System Empty From Full |
| Modulation Read Back Error | System Empty From Low |
| Mixer Empty | Valve Test |
| Raster Memory Overflow | Not Used |
| Valve Error | Good Phase |
| System Fill Failure or Tank Not Filling | Good Time of Flight (TOF) |
| System Fill Again | Modulation Low |
| Real Time Clock (RTC) Invalid | Modulation High |
| Ink Core Change | Viscosity Too High |
| EHT Not Calibrated | Viscosity Too Low |
| Printhead Temperature Too High | Tuning Required |
| Printhead Temperature Too Low | Ink Ready for Empty |
| Time of Flight Too High | Make-up Ready for Empty |
| Time of Flight Too Low | Printhead Off |
| Gutter Detect Disabled | Guarded Selection |
| Printhead Cover Removed | All Threads Suspend |
| Phase Threshold Error | EHT Inhibited |
| Ink Viscosity Too High | Abort System Fill |
| Ink Viscosity Too Low | System Flush |
| Pressure Too High | Production Flush |
| Pressure Too Low | Sequence All Stop |
| Mod Driver Chip Over Temperature | Print Overlap |
| No Ink Cartridge | No Time to Phase |
| Wrong Ink Cartridge | No Time for Time of Flight (TOF) |
| Ink Cartridge Expired | Overspeed |
| Ink Cartridge Low | Too Often, Print Queue Too Deep |
| Ink Cartridge Empty | No Valid Ink Parameters |
| Ink Insertions Exceeded | Possible Ink Coefficient Update |
| No Make-up Cartridge | USB Connection Is Over Current |
| Wrong Make-up Cartridge | Heater Failure |
| Make-up Expired | Tank, Core not Filling |
| Make-up Cartridge Low | DAC Overflow |
| Make-up Cartridge Empty | DAC Comms Error |
| Make-up Cartridge Insertions Exceeded | Charge Not Trimmed |
| Ink Core Level High | Throw Error |
| Ink Core Level Low | FW Table Index Not Found |
| Pump Fault | FW Compensation Has No Rasters |
| Pump Near Maximum | Creating Raster Catalog |
| Cabinet Hot | Wrong Raster Table Name |
| Product Delay Too Short | Gutter Pump Fault |
| Line Too Fast, Overspeed | Cover Detect Disabled |
| | Charge Not Trimmable |

Faults and warnings are two kinds of events determined by the control process 180. Other events determined by the control process 180 include user operations input through the user input 182, and machine operations, such as print cycles, timestamps, inspections, and other operations, as listed in Table. 2.

TABLE 2

Example other events for an industrial printer.

| User Actions | Ink Data | Makeup Data |
|---|---|---|
| PrintEnable | Serial Number | Serial Number |
| PrintDisable | Time/Date | Time/Date |
| CleanStart | Ink Serial Number | M/U Serial Number |
| CleanStop | Ink Cartridge: Ink Type | M/U Cartridge: Ink Type |
| QuickStart | Ink Cartridge: Bottle Size | M/U Cartridge: Bottle Size |
| QuickStop | Ink Cartridge: Lot Info | M/U Cartridge: Lot Info |
| AbortCurrentSequence | Ink Cartridge: Best Used | M/U Cartridge: Best Used |
|  | Ink Cartridge: Information on | M/U Cartridge: Information on |
| NozzleFlush | Running | Running |
|  |  | M/U Cartridge zero vacuum point |
| MessageSelect | Ink Cartridge: # Cartridge Insertions | (offset) |
|  | Ink Cartridge: Required Makeup |  |
| MessageDeleted | Type | M/U Cartridge: Refit count |
| NewInkCartridge |  |  |
| NewMakeupCartridge |  |  |
| NewCore |  |  |
| ClearAlarms |  |  |
| PowerOff |  |  |
| PowerOn |  |  |
| SystemTimeChanging |  |  |
| SystemTimeChanged |  |  |

Values for other variables used and maintained by the control process 180 are called environmental variables. Example environmental variables include hardware, firmware and software versions, among others, as listed in Table 3.

TABLE 3

Example environmental variables for an industrial printer.

| Installation Data | Core Data |
|---|---|
| Serial Number | Serial Number |
| Time/Date | Time/Date |
| Model | Core Serial Number |
| Software Version | Printer Model |
| Firmware Version | Ink Core: Pump run hours |
| Build Version # | 1710 Birthdate |

TABLE 3-continued

Example environmental variables for an industrial printer.

| Installation Data | Core Data |
|---|---|
| WinCE version |  |
| CSB type (revision) |  |
| Single Head/Dual Head |  |
| Charge Table Version |  |
| Nozzle Frequency |  |
| Nozzle Micron Size |  |
| Special print mode setting |  |
| (Off, Traversing, DIN) |  |

Values for the user-set parameters are also used and maintained by the control process 180. Example user-set parameters are listed in Table 4.

TABLE 4

Example user-set parameters for an industrial printer.
User-set Parameters

| | | |
|---|---|---|
| PDType | BaudRate | JobName |
| PulseRate | FlowControl | MessageSelectSource |
| X3100EncoderType | BaudRate | MessageSelectBarcodeSource |
| ReductionFactorNumerator | Serial | MessageSelectBarcodeOffset |
| MultiStroke | ActualPressure | MessageSelectStringTail |
| ReverseMessage | HeadTemp | MessageSelectLength |
| ReverseAllCharacters | NozzleTemp | DisplayProdCount |
| MessageHeight | VelocitySetpoint | ChargeValue |
| MessageWidth | ActualVelocity | DropFreq1 |
| EncoderType | DropFrequency_1 | PhaseThreshold1 |
| SimPDDistanceMicroMeters | ModulationVoltageSetpoint_1 | AutoPrintOnJets |
| PH2PDDistanceMicroMeters | ModulationCurrent_1 | AutoPrintOnSelect |
| SubstrateDistanceMicroMeters | PrintingPhase_1 | SpecialPrintMode |
| LineSpeedMicroMetersPerSec | PhasingThreshold_1 | ReversedDelayM |
| PrintRepeatDistanceMicroMeters | CabinetTemperature | GutterDetect |
| ContinuousPrintMode | MakeupVacuum | Daylight |
| ContinuousPrintPECTriggered | EHTVoltage | NozzleType |
| ContinuousPrintPECGated | EHTTrip | RollOverHour |
| PrintingDistance | InkCorePumpRunHours | RollOverMin |
| TimeModeDelayUS | GutterDetectStatus_1 | MesageConfigUnits |
| ThrowDistance | InkCoreLevel | ConduitLength |
| PrintIntervalMicroMeters | PrintCount | HeadElevation |
| ProductLengthMicroMeters | PhaseProfile_1 | CoverDetect |
| EncoderResolution | InkCartridgeInfoOnRunning | GutterTacho |
| ProductPECFilterEnabled | MakeupCartridgeInfoOnRunning | BufferingPrintMode |

TABLE 4-continued

Example user-set parameters for an industrial printer.
User-set Parameters

| Mode | TargetPressure | PrintCompletePulses |
|---|---|---|
| MsgMode | TCTargetPressure | EHTMaxV |

For a network including a plurality of industrial printers, which may number in the thousands, it can be seen that there is a huge amount of data that can be obtained, including the above-mentioned sensor data, parameter data, fault and warning events, other events, and environmental data. All of this data in combination can be considered historical data. Based on this historical data, a computer system or processor can determine correlations between the data, such as between environmental conditions and fault data. For example, it may be determined that for printers in high temperature environments, pump motors are more likely to overheat and have a shorter service life. These correlations can be used to determine the action to be performed on the printer.

The sensor data can be used (potentially in combination with historical data) to predict potential failures or other faults. Examples are shown in Table 5 below. For example, if the speed of a pump is changing over time, it may indicate that the pump is wearing and will fail at a certain point. As another example, an increasing pressure drop across a filter indicates that maintenance on the filter may be required. By compiling historical data from hundreds or thousands of printers in the field under a variety of operating and environmental conditions, correlations are made between the sensor data and the potential faults so that uptime can be maintained. For example, it may be known that after the pressure drop across a filter reaches a certain value, the printer will experience a failure 90% of the time within the next week. Therefore, it is advisable to perform preventative maintenance on the filter before failure occurs. As another example, for a fume/gas sensor, it may be determined that if the gas content (e.g. solvent such as MEK) in the printer cabinet exceeds a predetermined value, that indicates that, more likely than not, there is a solvent leak in the printer and maintenance needs to be performed. It can be seen that a variety of such correlations may be deduced from sensor data and used to provide a variety of warnings or actions to be taken. Of these, the number of missed prints, can be used in some embodiments to indicate productivity of the entire production line.

TABLE 5

Example predictive faults for an industrial printer.

| Sensor Data | Potential Fault |
|---|---|
| Gutter build up % | EHT trip or clipping mode |
| EHT % of trip value | Miscalibration, very dirty print head |
| Phase threshold | Ink charging problems |
| Phase rate of change | Break up instability |
| Humidity | Water contamination of ink, lack of dry air kit |
| Ink conductivity | Ink condition |
| Ink temperature | Reduce cooling airflow |
| Viscosity | Ink condition |
| Viscometer fill time | Restrictor blocking |
| Last chance filter pressure drop | Filter maintenance required |
| Ink filter pressure drop | Filter maintenance required |
| Pump speed | Pump wear |
| Pump drive % | Pump wear |
| Electronics temp vs ambient temp | Air filter blockage |
| Head temperature vs ambient temp | Head heater failure |
| Flush pump speed | Flush pump wear |
| Air pump speed | Air pump wear |
| Head vibration/shock | Poor print quality, low uptime, customer abuse |
| Valve open time (v1-v8) | Slow/lazy valves/sticking valves |
| Fume level | Vapor leak |
| PH cover time since last removed | Low uptime, lack of print head maintenance |
| Number of missed prints | Photocell obscured or damaged |

The system can also be used to monitor the operation of a printer in comparison to best practice operation data. The best practice operation data relates to predetermined processes for operating and/or maintaining the printer. The best practice operation data may be determined from design data, historical data from a plurality of printers, or from other sources. For example, it might be known that after the printer has been down more than 24 hours, it is best to provide a "clean start" that cleans a portion of the print head, before printing begins. If the user executes a quick start instead, that action would not be in compliance with best practice data. As another example, if the printer has a failure due to a high voltage trip, the best practice may be to remove the print head cover, clean the deflector plates with solvent, and allow the parts to dry before going back to run mode. If the user does something different, it would not be in compliance with best practices. The processor uses the parameter data, the sensor data, and the best practice data to determine compliance of the operation of the printer with the best practice data. As another example, it is known that if too many clean starts are performed, the printer will transfer a lot of solvent into the mix tank, which will dilute the ink, changing its viscosity and potentially negatively affecting the operation of the printer such as print quality. Thus, if a user performs too many clean starts, this would not be in compliance with best practice data. Using historical data from a variety of printers it may be determined from sensor data for example what the best practice operation is. In some embodiments, best practice is defined in terms of the target number of items to print in a particular time interval, and actual performance can be compared against such target performance.

According to some embodiments, the printer 110 includes the printer service client process 120, such as a control software program running on a processor of the industrial printer 110. The client process is configured to exchange data with a server process running on a different device, such as processing system 170, and provides access to the data received by control process 180, and also issues instructions to the control process 180, e.g., by changing values in the user settings data structure 184 or by issuing commands to which the control process responds, such as a command issued by a user through the GUI 186, or commands for an application programming interface (API) of the control process 180.

The client-server model for interactions among separate processes is well known in the art. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, but not limited to those reasons.

A remote servicing system for an industrial printer includes at least one industrial printer 110 with a printer service client process 120 and a printer service server process on a separate host in communication with the client 120, e.g. through a local or wide area network, or some combination. The server is configured to use at least the sensor measurements and the user-set parameter values to determine any of at least a set of service related issues for the printer, and to determine a remedial action for the service issue and initiate the remedial action, e.g., by dispatching a service technician with the correct replacement component or by issuing a command to be executed by the printer, or by changing one or more of the user-set parameter values in data structure 184, or some combination. In various embodiments, this server is modified to include the production line productivity module 172 to use information related to production line productivity, as described in more detail below with reference to FIG. 2 and FIG. 3.

One or more significant advantages accrue if the server process is at a different location from the industrial printer. For example, a printer servicing provider can reduce downtime at the production line facility of a customer using the printer by automatically informing the servicing provider's maintenance team or technical support of abnormal conditions and supplying the relevant information to address the problem. The servicing provider personnel can connect to and monitor the printer, to assess the issue and either provide corrective action remotely or dispatch an informed service tech with the correct parts to fix it right the first time. Real time performance display presentations (also called a "dashboard" hereinafter) provide key data about the printer, which can help the servicing 'provider pinpoint areas for improvement in the values of user-set parameter (the process of setting the values for these parameters is also called the "coding process" herein).

Thus, in some embodiments, a system includes multiple processors, an industrial printer configured to apply ink to, or otherwise mark, a package on a production line, a communications network configured to support data communication among the plurality of processors, and at least one memory including one or more sequences of instructions. The at least one memory and the one or more sequences of instructions are configured to, with at least one processor, cause the system to obtain sensor data that indicates values output by corresponding sensors configured to measure physical phenomena related to one or more components of the industrial printer.

Figure 1C:
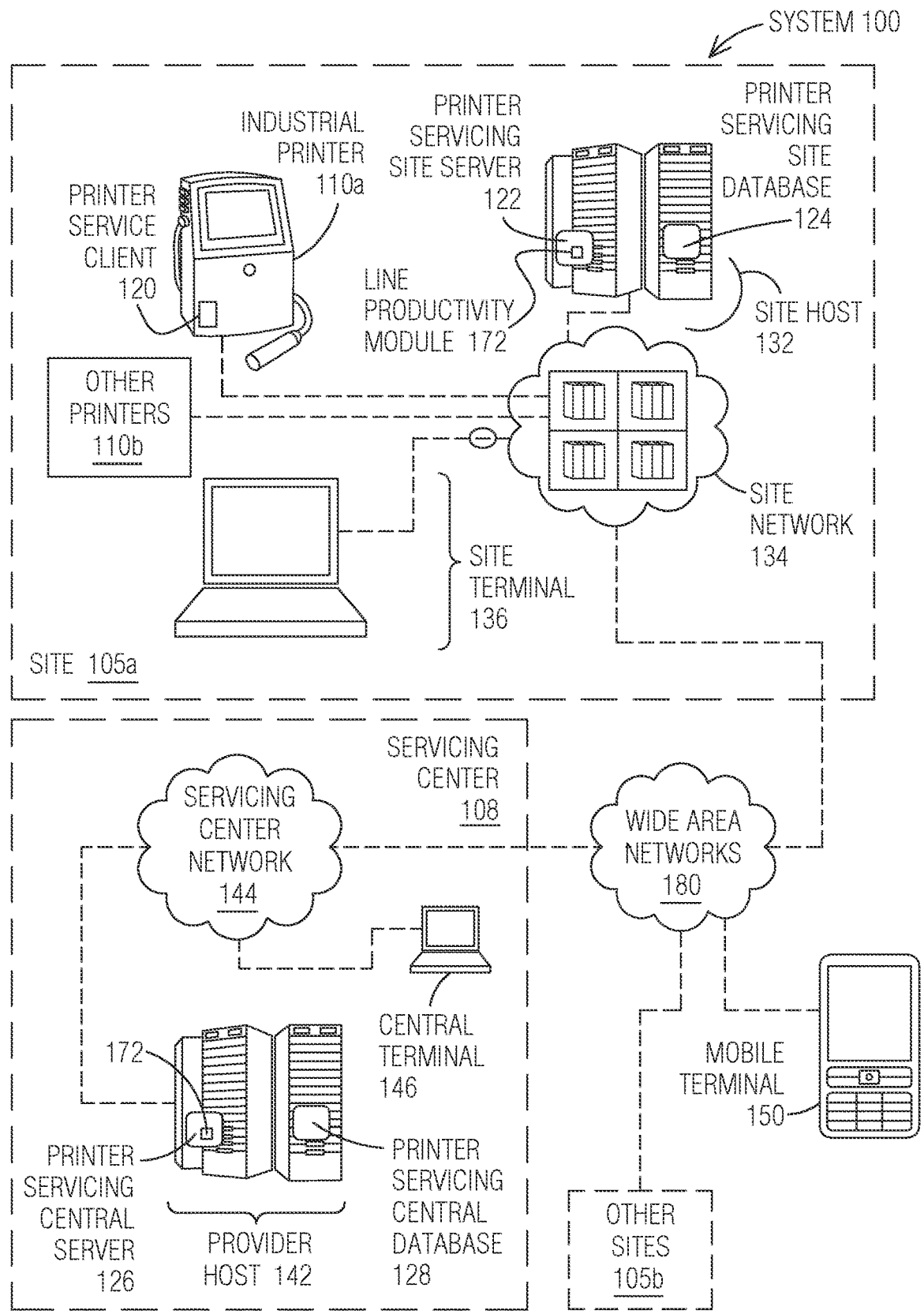
FIG. 1C is a block diagram that illustrates an example system for remote servicing of an industrial printer, according to an embodiment.

In some embodiments, the multiple processors are located at multiple facilities at corresponding multiple different locations; and, the industrial printer is at a particular facility of the multiple facilities. FIG. 1C is a block diagram that illustrates an example system 100 for remote servicing of an industrial printer, according to an embodiment. System 100 includes at least one industrial printer 110a at site 105a, such as one facility of a particular company, and at least one printer servicing server (e.g., printer servicing site server 122 on site host 132, or printer servicing central server 126 on provider host 142 at a remote service center 108 at a different facility), and at least one communications network (e.g., site network 134, or wide area network 180, or servicing center network 144, or some combination). In some embodiments, the system includes one or more separate sensors 178, such as digital optical sensors or digital cameras, that are not part of a printer 110, at one or more sites. A servicing operator or assembly shift operator interacts and controls the servers, in some embodiments, using an input device on the host (such as site host 132 or provider host 142), or on a separate terminal (such as site terminal 136 connected to site host 132 by the site network 134, or the central terminal 146 connected to the provider host 142 by the servicing center network 144). In some embodiments, the terminal used by the servicing operator is a mobile terminal 150, such as a smart phone, described below with reference to FIG. 12, connected to the server host through a wide area network 18 or in combination with one or more other networks, such as site network 134 or servicing center network 144.

According to an illustrated embodiment, the system is implemented on one or more networks e.g., site network 134, servicing center network 144 and wide area networks 180 as depicted in FIG. 1C. The networks include the Internet that is configured to switch data packets among terminals using the Internet Protocol (IP) and any of a variety of application level protocols, including the hypertext transfer protocol (HTTP) used to send World Wide Web pages between a World Wide Web client (called a Web browser, or, simply, a browser) and a World Wide Web server. Connected to the networks are several processes operating on hosts, including printer servicing client 120 on printer 110a and printer servicing site server 122 on host 132 and printer servicing central server 126 on host 142. In some embodiments, the terminals 136, 146 and 150 connect to the servers 122 or 126 using Web browsers by exchanging HTTP data packets to transfer the GUI of the dashboard and other web page screens, and transfer the operator response, if any, to the GUI of the dashboard and other screens. In various embodiments, the printer servicing site server 122 or the printer servicing central server 126, or both, includes the production line productivity module 172.

In some embodiments, site 105a includes zero or more other industrial printers 110b, and the printer servicing server (e.g., server 122 or server 126) uses one or more databases (e.g., printer servicing site database 124, or printer servicing central database 128, respectively, or some combination) to store data received from the printers 110a and 110b and zero or more separate sensors 178. In various embodiments, none, some or all of the production line data structure 173 is included in either or both of the separate databases 124 and 128. In some embodiments, system 100 includes zero or more other facilities at other sites 105b, and the printer servicing central server 126 is configured to service printers from all the sites 105a and 105b.

Although processes, equipment, and data structures are depicted in FIG. 1B and FIG. 1C as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2:
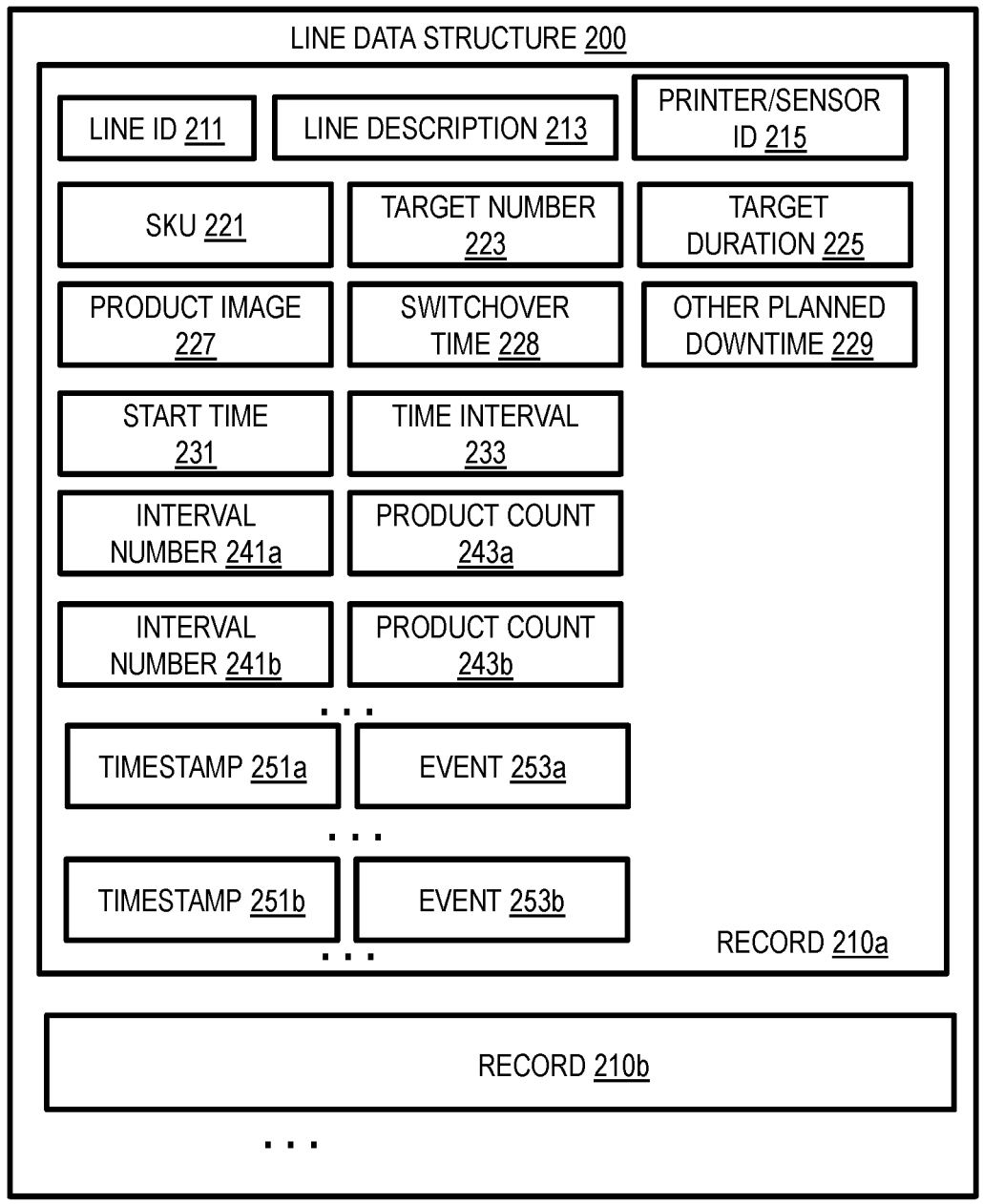
FIG. 2 is a block diagram that illustrates an example data structure for storing data from an industrial printer for use in determining production line productivity, according to an embodiment.

FIG. 2 is a block diagram that illustrates an example data structure 200 for storing data from an industrial printer and zero or more separate sensors 178 for use in determining production line productivity, according to an embodiment. The production line data structure 200 is an embodiment of the production line data structure 173 that is filled, maintained and used by the production line productivity module 172. The production line data structure 200 includes one or more production line records, such as production line record 210a and record 210b, among others indicated by ellipsis, collectively referenced hereinafter as production line records 210. Each production line record 210 includes one or more fields holding data that indicates one products produced by one production line for one production run, as indicated by the fields depicted in record 210a. Although fields in record 210a are depicted in FIG. 2 as integral blocks in a particular order for purposes of illustration, in other embodiments, one or more fields, or portions thereof, are arranged in a different order, in flat files or lists or tables, in zero or more databases, in one or more different memories, on one or more different computer hosts, or are combined, or are omitted, or one or more additional fields are added, or the data structure is changed in some combination of ways.

Line identifier (ID) field 211 holds data that indicates a unique identifier for a particular production line comprising one or more conveyor belts or other moving platforms, and one or more other production line components. Line description field 213 holds data that describes the line, e.g., a location in a facility, a nickname, a list of components on the line (including one or more product part dispensers, one or more parts assembling stations manned by human or robotic assemblers, one or more container dispensers, one or more fluid dispensing ports, one or more packaging components, zero or more unscramblers, fillers, cappers, case packer, palletizer, reject grabber, labeler, vison system, conveyers, buffers, accumulation tables, shrink wrappers, and one or more industrial printers for labeling parts or packages), or other descriptive information.

Printer ID field 215 holds data that indicates one industrial printer of the one or more printers on the production line, which printer is used to represent the operation of the whole production line. Such an industrial printer is called the representative printer. Any industrial printer or marking equipment that can be programmed to report (e.g., send a report message including) a count of print operations in a time interval (also called herein a smart industrial printer, or simply, a "smart printer," for convenience) may be used as the representative printer, including an inkjet printer, a laser charged drum and toner printer, or a laser etching marker, a thermal ink jet printer, a thermal transfer overcoat printer, drop-on-demand printer, a direct thermal label maker, among others, or some combination. In some embodiments in which one or more separate sensors 178 that are not part of the printer components are nonetheless reporting production line counts or other productivity data, field 215 incudes data that uniquely indicates the one or more separate sensors 178.

Fields 221 to 229 define one production run on the production line indicated in field 211. Stock Keeping Unit (SKU) is a number assigned to a product by a company for stock-keeping purposes and internal operations. SKU field 221 holds data that indicates the SKU number or other number that indicates a particular product to be produced by the production line in the production run. Target number field 223 holds data that indicates a number of products to be produced during one production run. Target duration field 225 holds data that indicates a time duration for the production run in which the target number of products is to be output by the production line. In some embodiment the target duration field 225 holds data that indicates a target start time or a target end time with the duration, or both in lieu of duration. Product image field 227 holds data that indicates an image of the product associated with the number in SKU field 221. It is advantageous to include such an image, because such an image is more readily understood by a human operator than an abstract identifier in field 221, to easily ensure the production line is operating properly. Switchover time field 228 holds data that indicates an amount of time during which a production line is not operating so that components can be modified to change to the product identified in field 221 from a different product previously produced on the production line identified in field 211. Other planned downtime field 229 holds data that indicates any scheduled maintenance on one or more production line components, including one or more industrial printers, during the production run. For example, the production line may be stopped until a tank feeding a fluid dispenser is swapped out for more of the same fluid, or a printer ink supply is restored. That event, and the associated time duration for it to occur, is indicated by the data in field 229. Start time field 231 holds data that indicates a time when the production run is to start, if that time is not included in field 225.

Fields 233 through field 253b, among others indicated by ellipses, hold data that indicates actual performance of the production line during the production run, as determined at least in part by the smart printer. The time interval field 233 holds data that indicates a time interval for which the number of items printed by the representative printer during the production run is reported to a processor that will store data into data structure 200. The interval number fields 241a, 241b, among other indicated by ellipses, collectively referenced hereinafter as interval number field 241, hold data that indicates the number of time intervals (of duration given by time interval field 233) since the time in the start time field 231. Associated with each interval number field 241a, 241b, among others indicated by ellipses, is a product count field 243a, 243b, among others indicated by ellipses, respectively. The product count fields 243a, 243b, among other indicated by ellipses, collectively referenced hereinafter as product count field 243, hold data that indicates the number of products printed or detected by separate sensor 178. In some embodiments the count is the number of products printed, or detected, since the time in the start time field 231, and the number printed in the most recent interval is the difference from the count in the immediately pervious product count field. In some embodiments, the count indicates only an increment in the number of products printed or detected during the time interval associated with the associated interval number in field 241.

In some embodiments, the smart printer or other production line component, is operated to report (e.g., send an event report message for) one or more events. When such an event occurs during the production run an event timestamp field

251*a*, 251*b*, among others indicated by ellipses, collectively referenced as event timestamp field 251, is stored in production line record 210. Associated with each event timestamp field 251*a*, 251*b*, among others indicated by ellipses, is an event field 253*a*, 2453*b*, among others indicated by ellipses, respectively. The product event fields 253*a*, 253*b*, among other indicated by ellipses, collectively referenced hereinafter as event field 253, hold data that indicates the event at the printer or other comment of the production line.

Figure 3:
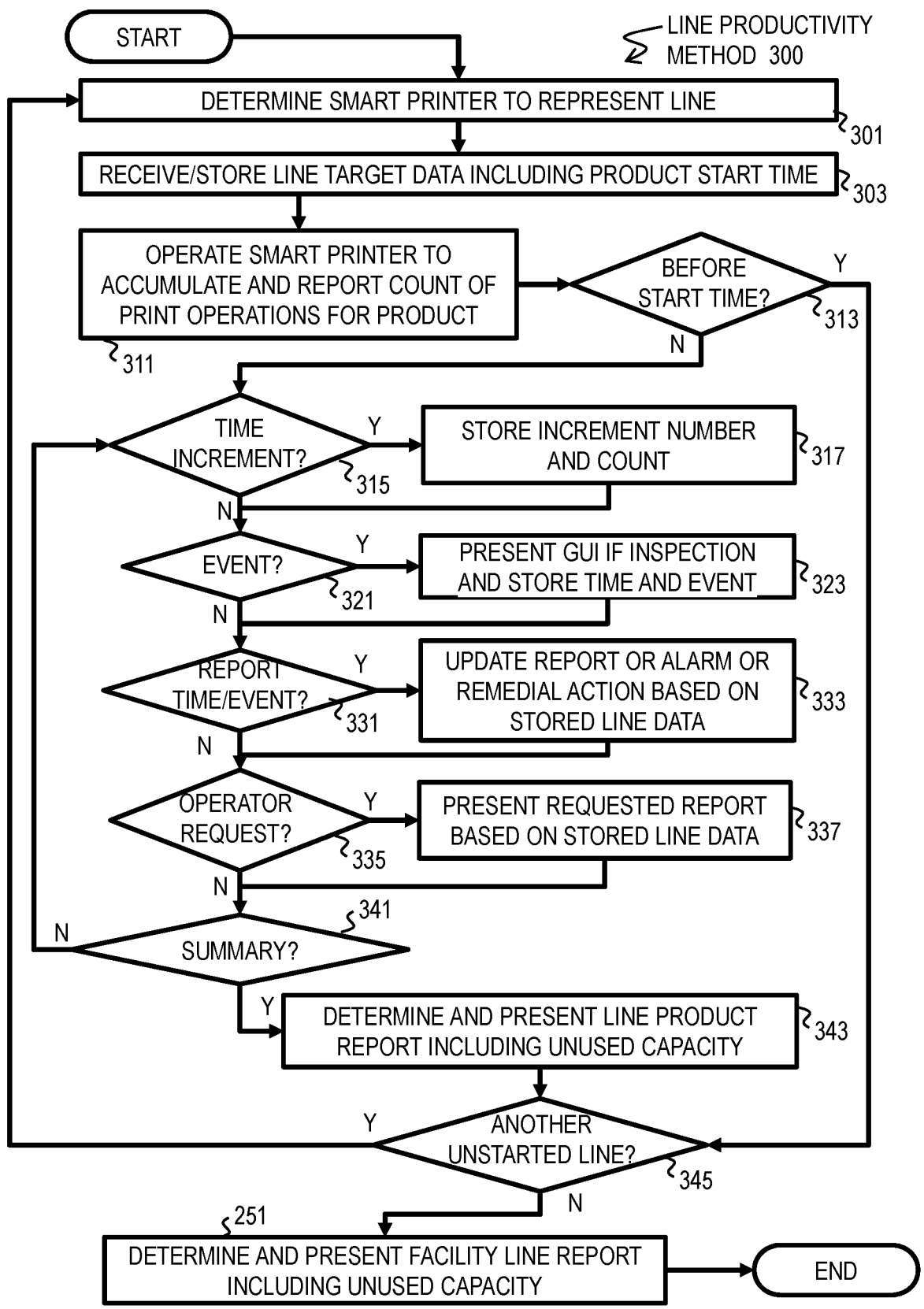
FIG. 3 is a flow diagram that illustrates an example method in a processor for determining production line productivity based on an industrial printer, according to an embodiment.

FIG. 3 is a flow diagram that illustrates an example method 300 in a processor for determining production line productivity based on an industrial printer, according to an embodiment. The production line productivity method 300 is performed by production line productivity module 172. Although steps are depicted in FIG. 3, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 301, one smart industrial printer on a particular production line is designated as the representative printer for a current production run on that production line. In some embodiments, additional printers are designated and ranked as backup representative printers, should the representative printer fail during the production run. Any method may be used to determine which printer is so designated and which printers serve as backups, including receiving manual input, retrieving from a local or remote data file or database, or receiving the information in a message, either unsolicited or in response to a query message, or based on some algorithm in which printers are ranked by advanced features or location farthest upstream or downstream on the production line. Once selected, the production line identifier and description are stored with the representative printer in fields 211, 213 and 215 of a record 210 in the production line data structure 200. For example, in some embodiments the representative printer is selected by a production line operator using a graphical user interface, such as a screen with active areas depicted in FIG. 4A.

Figure 4A:
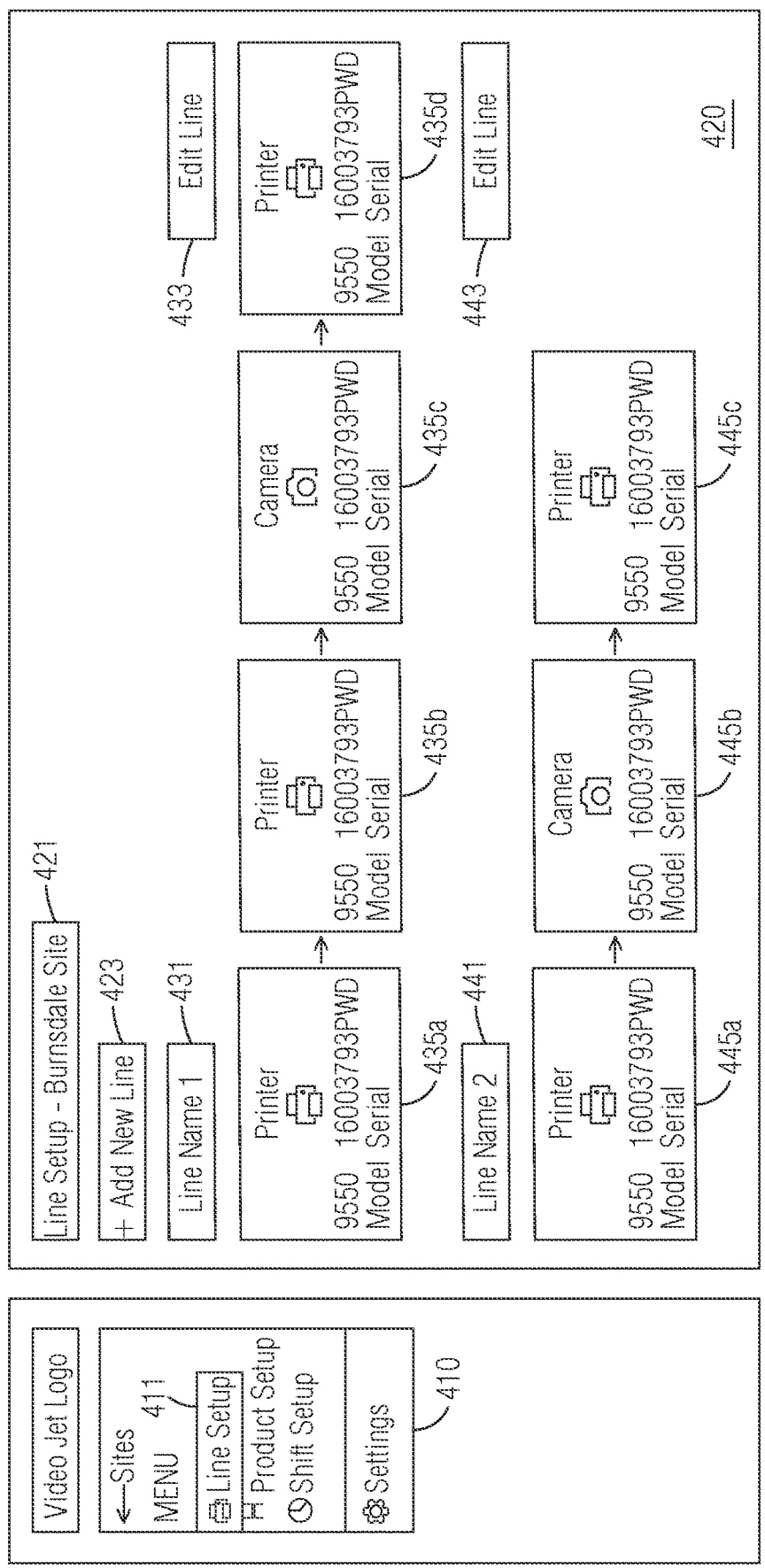
FIG. 4A and FIG. 4B are block diagrams that illustrates an example user interface for configuring an industrial printer on a production line, according to an embodiment.
Figure 4B:
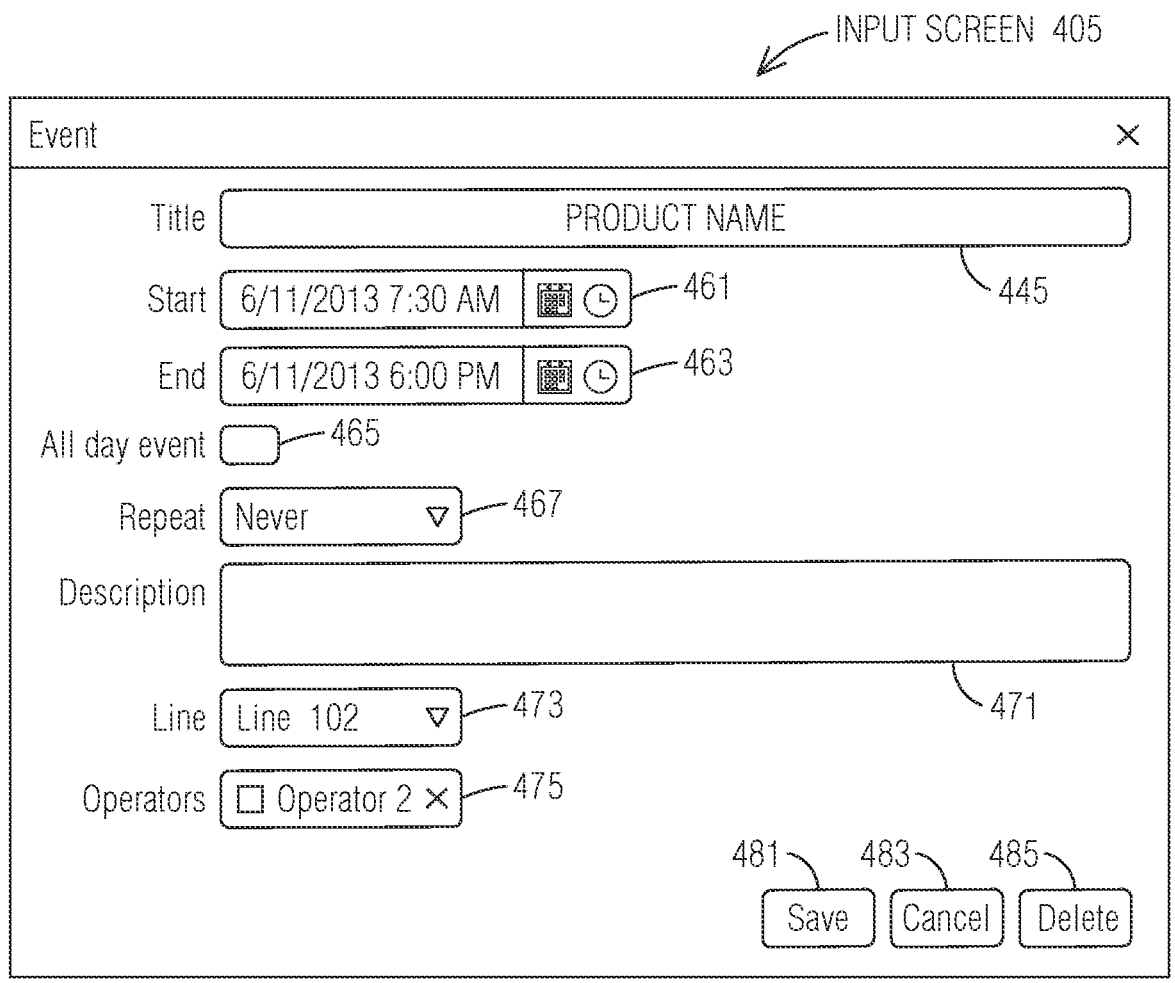

FIG. 4A and FIG. 4B are block diagrams that illustrates an example user interface for configuring an industrial printer on a production line, according to an embodiment. Thus, FIG. 4A is a diagram that illustrates an example screen on a display device of a terminal in the system 100, such as site terminal 136, central terminal 142 and mobile terminal 150, according to an embodiment. The screen includes one or more active areas that allow a user to input data to operate a system. As is well known, an active area is a portion of a display to which a user can point using a pointing device (such as a cursor and cursor movement device, or a touch screen) to cause an action to be initiated by the device that includes the display. Well known forms of active areas are standalone buttons, radio buttons, check lists, pull down menus, scrolling lists, and text boxes, with or without associated keyboards, among others. Although areas, active areas, windows and tool bars are depicted in FIG. 4A and FIG. 4B as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways.

FIG. 4A depicts an example input screen 401 for selecting the representative printer. The input screen 401 includes a screen navigation area 410 which includes several active areas, one for each input screen to which an operator can navigate, including active area 411 for selecting a production line setup input screen. When that active area is selected the panel 420 is displayed. Panel 420 includes a site selection active area 421, such as a pull-down menu to select one of one or more sites where the operator can determine the makeup of each production line. Once a site is selected, the panel 420 provides subareas indicating each of one or more production lines at the site and an active area 423 for adding a new production line for the site. Each production line subarea includes a line name active area 431, 441 where a line identifier, such as a line name, may be entered. Each line identifier is unique for the site indicated in area 421. Each production line subarea also includes an edit line active area 433, 443 to allow the operator to add, move or remove a component of the production line. Each production line subarea also includes a row of production line active areas for components 435*a*, 435*b*, 435*c*, 435*d* (collectively referenced as line components 435) in order of their appearance along the line as indicated by intervening arrows for line named in area 431; and line components 445*a*, 445*b*, 445*c* (collectively referenced as line components 445) in order of their appearance along the line as indicated by intervening arrows for line named in area 441. The line components 435, 445 have sensors that may be used to determine the productivity of the production line, and include such components 435*c* and 445*b* as cameras, serving as separate sensors 178, and such components 435*a*, 435*b*, 435*d*, 445*a* and 445*c* as smart printers. By selecting an active area representing one component, that component can be designated a representative component for the production line. Unlike previous approaches, a smart printer can be designated a representative component, called herein a representative printer.

Returning to the method 300 of FIG. 3, in step 303, data about the production run is received and stored in the record 210 for the production run of the production line data structure 200. In various embodiments, the production run data includes data that indicates production line target data such as production start time and target number of products, e.g., data for two or more fields 221 through 225 and zero or more fields 227 through 229. Any method may be used to obtain this data, including receiving manual input, retrieving from a local or remote data file or database, or receiving the information in a message, either unsolicited or in response to a query message.

FIG. 4B depicts an example input screen 405 for describing the production run. The input screen 405 includes several active areas. Active area 455 allows a production line operator to indicate the product to be produced during the production run or otherwise name the production run. Active areas 461 and 463 allow the production line operator to specify a start time and end time, respectively, for the production run; or, in other embodiments, a start time and duration for the production run. In the illustrated embodiment, an active area 465 allows the production line operator to choose an all day event in lieu of a start time and duration. In the illustrated embodiment, the screen includes and active area 471 to enter a description of the production run. In some embodiments, this active area 471 is used to indicate a target number of the product to produce during the production run. In other embodiments, an active area, not shown, is included to allow the production line operator to specify the target number of the product to produce during the production run. Active area 473 allows the production line operator to indicate which production line is to be used for the product, e.g., selecting one of the production lines described in panel 420 of FIG. 4A. In the illustrated embodiment, the screen 405 includes active area 475 for indicating the number or name of personnel on one or more shifts during the production run. Active area 481 allows the operator to save the production run data, during which at least some of the information is stored in a record 210 of the data structure 200. Active area 483 allows the operator to exit the screen without saving any changes. Active area 485, allows the operator to delete a production run form the stored data, such as deleting a record 210 in the production line data structure 200.

Returning to the method 300 of FIG. 3, in step 311, the representative printer is operated to accumulate and report (e.g., send a report message including) count of print operations (also called "print count" herein) for the production run. For example a series of commands is sent to the printer with: the message to be printed (associated with the product of the production run); a time to start printing with the new label (e.g., based on the data entered into active area 461; an instruction to zero out the print count; an instruction to set the print count reporting interval. In some embodiments, the print count reporting interval is defaulted to a value, such as a value in a range from about 5 minutes to about 30 minutes, and preferably a value about 15 minutes. In some embodiments, the print count is not zeroed out, but left to accumulate from any start value. Because the print count can be recorded at zero time, the print count relative to the print count at zero time provides the number of print operations during the current production run.

In step 313, it is determined if the current time is before the start time for the production run, if so, control passes to step 345 to determine if there is another unstarted production line. If there is no remaining production line that has not started a production run, then a report (e.g., a report document) for all the production lines at the site is generated in step 251 and presented. Then the process ends. If there is any production line that has not yet started a production run, then control passes back to steps 301 through 311 and following to prepare the next production line for starting or revisit a production line already set up but not yet started. Eventually, during step 313 a production line is found for which the production run start time is reached, and control passes to step 315.

In step 315, it is determined if a time increment report message is received from the representative printer configured as described in step 311. If so, control passes to step 317 to store production line data including the increment number and print count based on the report in the next pair of fields 241 and 243 in the record 210 for the current production run. If the printer does not reset its print count, then the first report represents the start time (increment number=0) and the count represents the initial count before starting the production run. If the printer does reset its print count at the start of the production run, then, in some embodiments, the first report represents the increment after the start time (increment number=1) and the count represents the count during that first time increment. If the printer does not reset its print count after every time increment, then the count represents a cumulative count, and the count during the increment is the difference from the cumulative count for the previous time increment.

In some embodiments, step 317 includes receiving over communication lines from a separate sensor 178, that is not part of an industrial printer 110, separate data that indicates a count of products on the production line. Storing production line data then includes storing supplemental data based on the separate data from the separate sensor. In addition, the separate sensor serves as a reject counter for automatic reject tracking. In some embodiments, the separate sensor is a photo-eye that connects to a local wireless network.

In step 321, it is determined if an event report message is received from the representative printer configured as described in step 311, or from any other production line component configured to send event report messages. If so, control passes to step 323 to store a timestamp for the time the report message was received (or timestamp included in the event report message) and a code for or a description of the event in the next pair of fields 251 and 253 in the record 210 for the current production run. In some embodiments, the event is of no consequence to production line productivity and the timestamp and event code or description is not recorded for that particular event.

In some embodiments, the event is associated with production line stoppage or slowdown, collectively referenced herein as production line downtime. For example, in some embodiments, an event is issued when the print count or separate sensor 178 indicates a significant reduction in the rate of product movement along the production line 190. In some of these embodiments, the downtime is associated with a scheduled downtime, e.g., as recorded in field 228 or field 229 of the line data structure depicted in FIG. 2. If so, then in step 323 the event is recorded as scheduled downtime. If not associated with data in the fields 228 or 229, then the event is labeled as unscheduled downtime during step 323.

In some embodiments when an event is labeled as scheduled or unscheduled downtime, a user is allowed to re-label the downtime during step 323. Thus, in some embodiments, step 33 includes presenting a user interface configured to receive label input data that indicates a change in a label for observed downtime between a label of scheduled downtime and a label of unscheduled downtime.

In some embodiments, when the event is detected downtime, step 323 includes having a user provide a reason for the downtime, called an event code, such as is described in more detail below with reference to FIG. 9A. In these embodiments, step 323 includes presenting a user interface configured to receive reason for downtime.

In some embodiments, when the event is detected downtime, step 323 includes having a smart printer provide a reason for the downtime. In such embodiments, an event code is produced automatically based on a different one or more sensors in the industrial printer 110 than produces the count of print operations. The event code indicates a printer condition or event associated with production down time for at least one of the representative printer or a different printer on the production line. Storing the production line data includes storing the event code produced automatically during step 323.

In some embodiments, an event report message is issued by a device, such as a tablet or smart phone, in the hands of an inspector as the inspector is prepared to inspect a product on the production line. In some embodiments, the event is an inspection and need not be directly concerned with production line production data. In some embodiments, the inspection data is received through GUI and the results recorded. Thus, in some embodiments, step 323 includes presenting a inspection user interface configured to receive inspection data based on manual input provided by an inspector and storing on a computer-readable medium the inspection data.

In step 331, it is determined if an event report message is to be reported to a production line operator or if the current time is a time to update a production line status report (such as dashboard screen visible to the production line operator, and described in more detail below). If so, then in step 333 the event is reported the production line operator (e.g., in a message to a local or remote terminal in the possession of the production line operator) or the production line status report is updated or both. In either case, requested report is prepared and presented on a display device accessible to a production line operator.

In step 335 it is determined whether a request is received from an operator, at a local or remote terminal, for a certain kind of report on production line productivity, such as a report on total output, a report on production rate, a report on deviation from targets, or a report predicting productivity by the end of the production run, or some combination. If so, control passes to step 337 to prepare the requested report and present it on a display device accessible to a production line operator. A format for displaying such reports is provided below with reference to FIG. 5; and, further examples are provided in the examples section.

In step 341, it is determined if summary report conditions are satisfied. Any summary report conditions can be used, such as shift end, passage of time equal to the target duration after the target start time (e.g., the target end time entered in field 463), passage of time equal to the target duration after the first product is printed, or a print count equal to the target number of products, among others, or any combination. If not, then control passes back to step 315 and following to continue to accumulate interval counts and events.

If it is determined in step 341 that summary conditions are satisfied, then control passes to step 343. In step 343, a summary report is generated and presented on a display device accessible to the production line operator. Values for various parameters are presented in various embodiments, such as performance relative to targets, or performance correlation with various factors such as production line, shift, product, package, production line component, or unused capacity of the production line, or total and constituent elements of downtime, among others, or some combination. Control then passes to step 345 to configure or monitor any yet unstarted lines.

Figure 5:
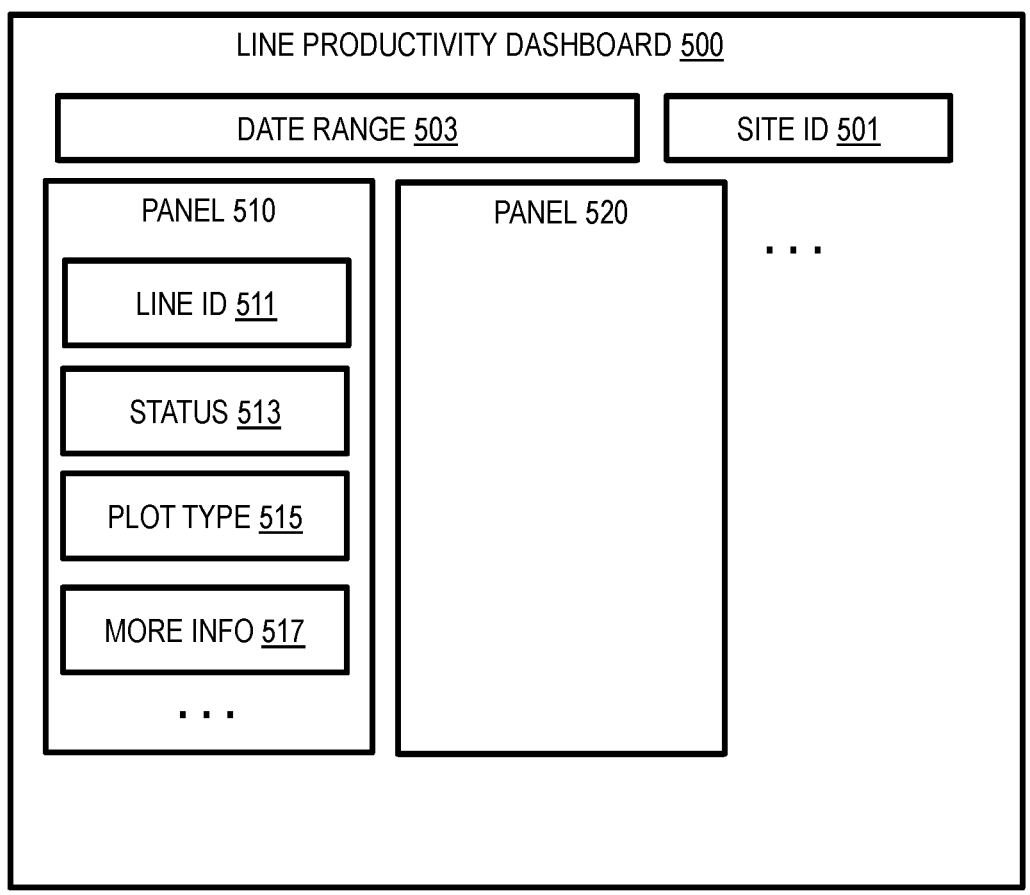
FIG. 5 is a block diagram that illustrates an example user interface (called a dashboard) for reporting productivity of a production line, according to an embodiment.

FIG. 5 is a block diagrams that illustrates an example user interface 500 (called a dashboard) for reporting productivity of a production line, according to an embodiment. Such reports can be performed per production line, as in step 343, or for multiple production lines or multiple facilities, as in step 251. The dashboard 500 includes a date range active area 503 that can be used to enter a data range for examining production line productivity. The dashboard 500 also includes a site ID active area 501 that can be used to select any one or more sites for which production line productivity data can be amalgamated. The dashboard 500 also includes one or more summary panels 510 among others indicated by ellipsis, and one or more graph panels 520 among other indicated by ellipsis.

Each summary panel 510 gives a current or average value of one or more metrics of productivity. For example, each panel 510 includes line ID area 511, a line status area 513, a plot type area 515, and a more info area 517, among zero or more others indicated by ellipsis. The line ID area 511, provides data that indicates the production line or production run or some combination. The status area 513 presents values for one or more parameters that summarize status of the current or latest production run. The plot type area 515 is an active area that allows a user to select a type of graph to be presented in graph panel 520. Example graphs are described below in the examples section with reference to FIG. 6A through FIG. 9C.

The more info area 517, is an active area. When selected by a user, the panel 510 is replaced with a list of related information, such as production run description, representative printer, line components, among other information, or a graph, or some combination for one or more production runs that fall within the date range and sites indicated in active areas 503 and 501, respectively.

Thus the dashboard provides a means for a user at a terminal, removed from the printer, to determine the relative state of each of one or more production lines and production runs. In some embodiments, the dashboard also provides an active area so a user at a terminal, removed from the printer, can issue a command or suggest an operation to be performed at the printer. The dashboard 500 allows a user to view actual performance by line over user defined time period; gets a sense for whether targets are appropriate, either positive or negative; tracks OEE performance on one or more production lines over time against a target. Groupings of production lines and time frame are user selectable. A user can use active areas to drill down on specific time periods for more detail. The system provides access to the following types of data: throughput vs. targets; OEE; equipment status; downtime events; upcoming schedule; and configurable alerts. The user can choose to view the information at multiple levels, including: plant; production line (e.g., packaging line); product; and, individual equipment. The data can be provided over different time frames: real time performance; shift projections; and, historical trends.

Thus, FIG. 3 illustrates an example method 300 that includes obtaining initialization data that indicates a representative industrial printer used on a production line at a facility and a product to be output by the production line. The method 300 also includes obtaining target data that indicates a target start time and a target number of the product and a target duration for producing the target number of the product. The method further includes operating the representative industrial printer to report a count of print operations for the product at regular time intervals. Still further, the method includes storing production line data that indicates the count of print operations and the time interval. Yet further, the method includes, upon a condition precedent, determining a production line report that indicates productivity of the production line based on the count of print operations and the target data, and presenting the line report on a display device. The condition precedent is one or more of a group including: passage of the target duration after the target start time; passage of the target duration after a first print operation for the product; a change in shift workers on the production line; a time of day; and a predetermined event.

2. Example Embodiments

Figure 6A:
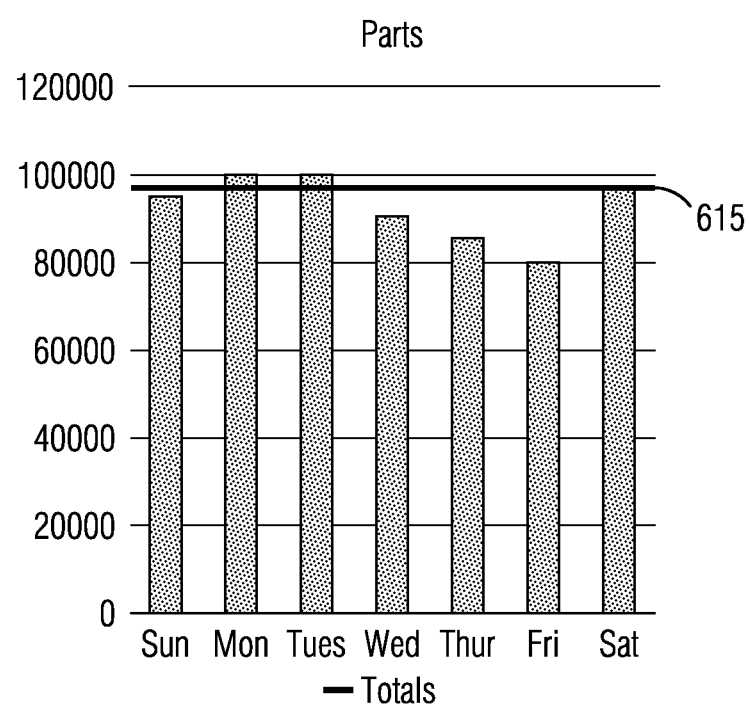
FIG. 6A through FIG. 6C are graphs that illustrate example contents for panels for reporting productivity of a production line, according to an embodiment.
Figure 6B:
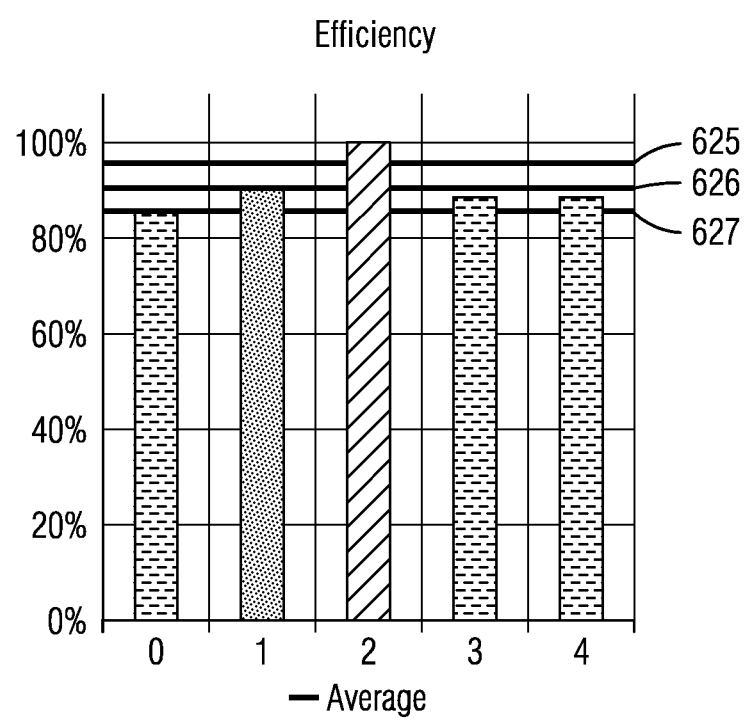
Figure 6C:
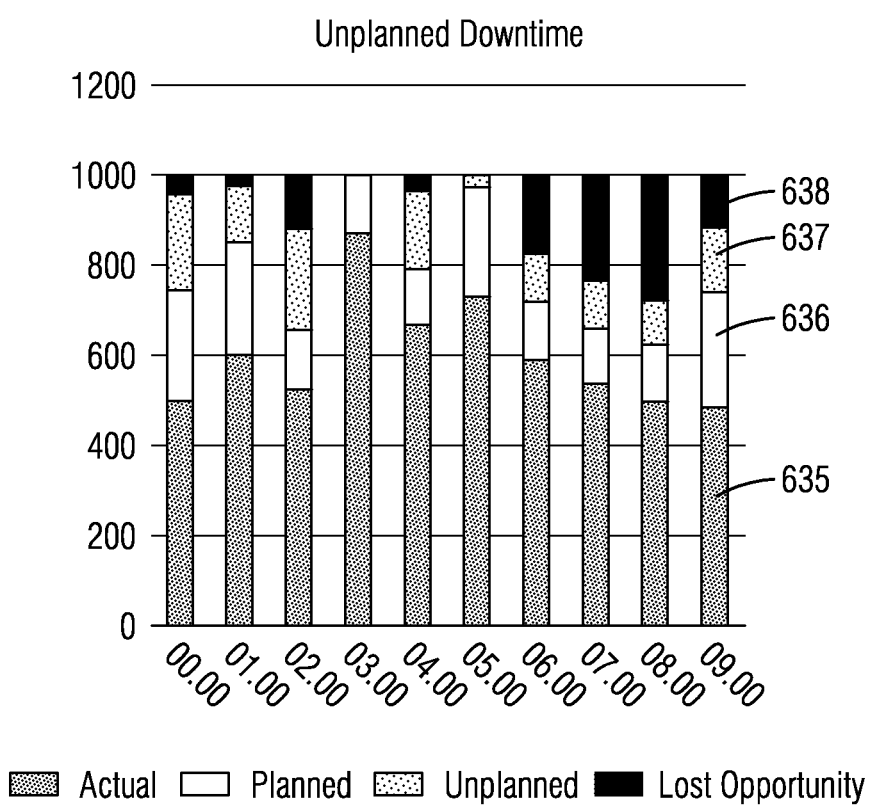

FIG. 6A through FIG. 6C are graphs that illustrate example contents for panels 520 for reporting productivity of a production line, according to an embodiment. FIG. 6A is a bar graph that depicts example total number of products produced on a production line by days of the week for a time interval and site specified in dashboard 500 area 503 and 501, respectively. The horizontal axis indicates day of the week and the vertical axis indicates number of products produced. The graph indicates the number of items packaged per day vs. target for that line. The bars indicate the accumulated counts for the production runs on those days based on the start time in field 231, interval number in field 241 and product count in field 243. The horizontal line 615 indicates the target number of products based on data in field 223.

FIG. 6B is a bar graph that depicts example OEE for a time interval and site specified in dashboard 500 area 503 and 501, respectively. The horizontal axis indicates hour number starting with hour zero for a time interval and site specified in dashboard 500 area 503 and 501, respectively. The vertical axis indicates overall equipment effectiveness (OEE). Hour number 2 showed good performance with OEE levels at or over 95% indicated by line 625 and are hatched diagonally. Hour number 1 showed average OEE levels at or over 90% indicated by line 626 but less than 95% and are hatched with stippling. Hours number 0, 3 and 4 showed marginal OEE levels at or over 85% indicated by line 626 but less than 90% and are hatched with dashes.

FIG. 6C is a bar graph that depicts example actual throughput and gaps to target by category for a time interval and site specified in dashboard 500 area 503 and 501, respectively. The horizontal axis indicates hour number starting with zero. The vertical axis indicates the difference from a target production rate of 1000 units per hour. The lowest section 635 of each bar 635 indicates the number of units actually produced during the hour. The next section 636 of each bar indicates the number of units that could have been produced except for planned downtime. Planned downtime can be inferred from fields 228 and 229 in a record 210 of the line data structure, along with events indicated in one or more event fields 253 and associated timestamps in field 251 when product counts are not incrementing. The next section 637 of each bar indicates the number of units that could have been produced except for unplanned downtime. Unplanned downtime can be inferred from events indicated in one or more event fields 253 and associated timestamps in field 251 when product counts are not incrementing. The top section 638 of each bar indicates the number of units that could have been produced when the production line was not down, but were not. These units represent a lost opportunity to make the line more productive.

Figure 7A:
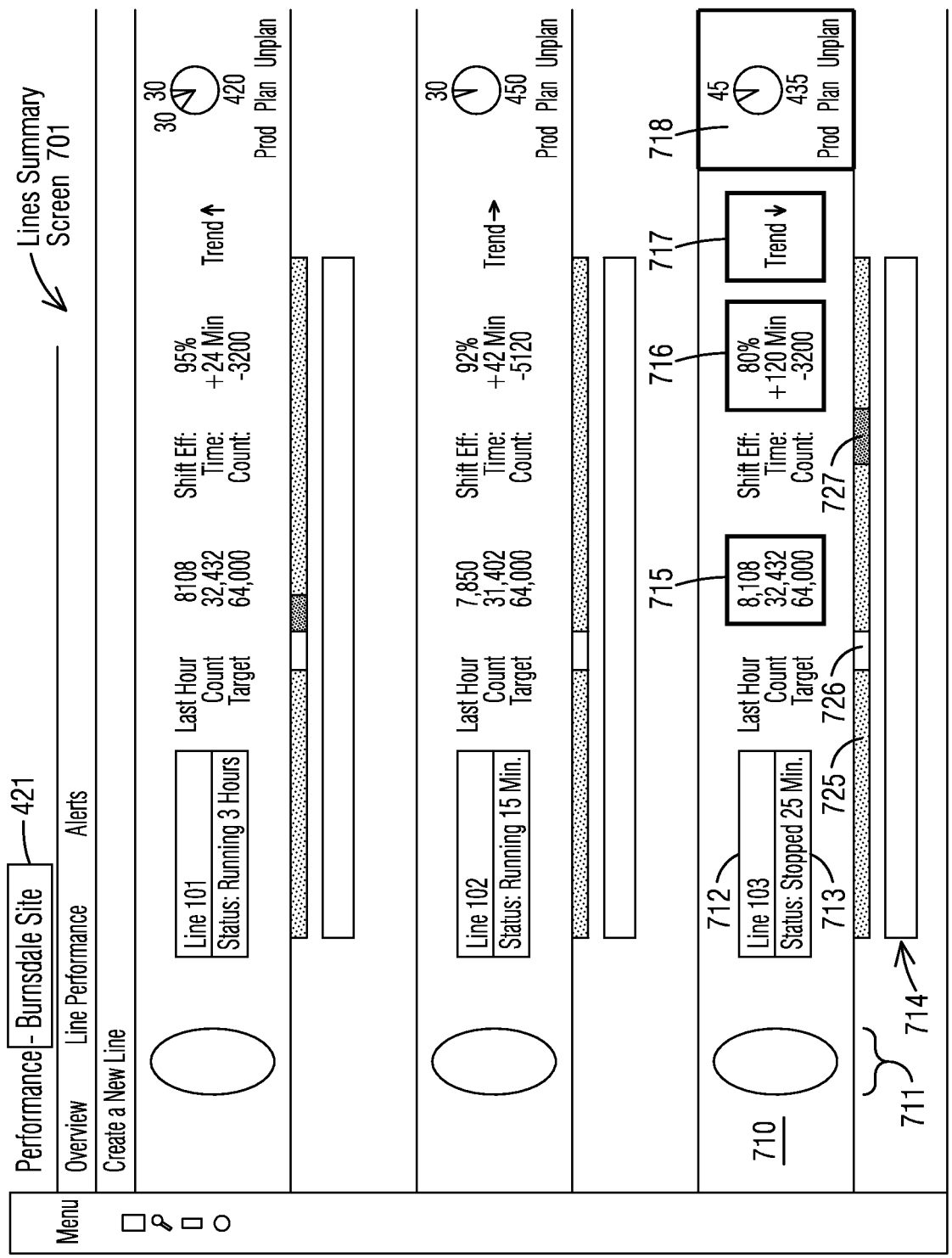
FIG. 7A through FIG. 7B are block diagrams that illustrate example screens for reporting productivity of a production line, according to an embodiment.
Figure 7B:
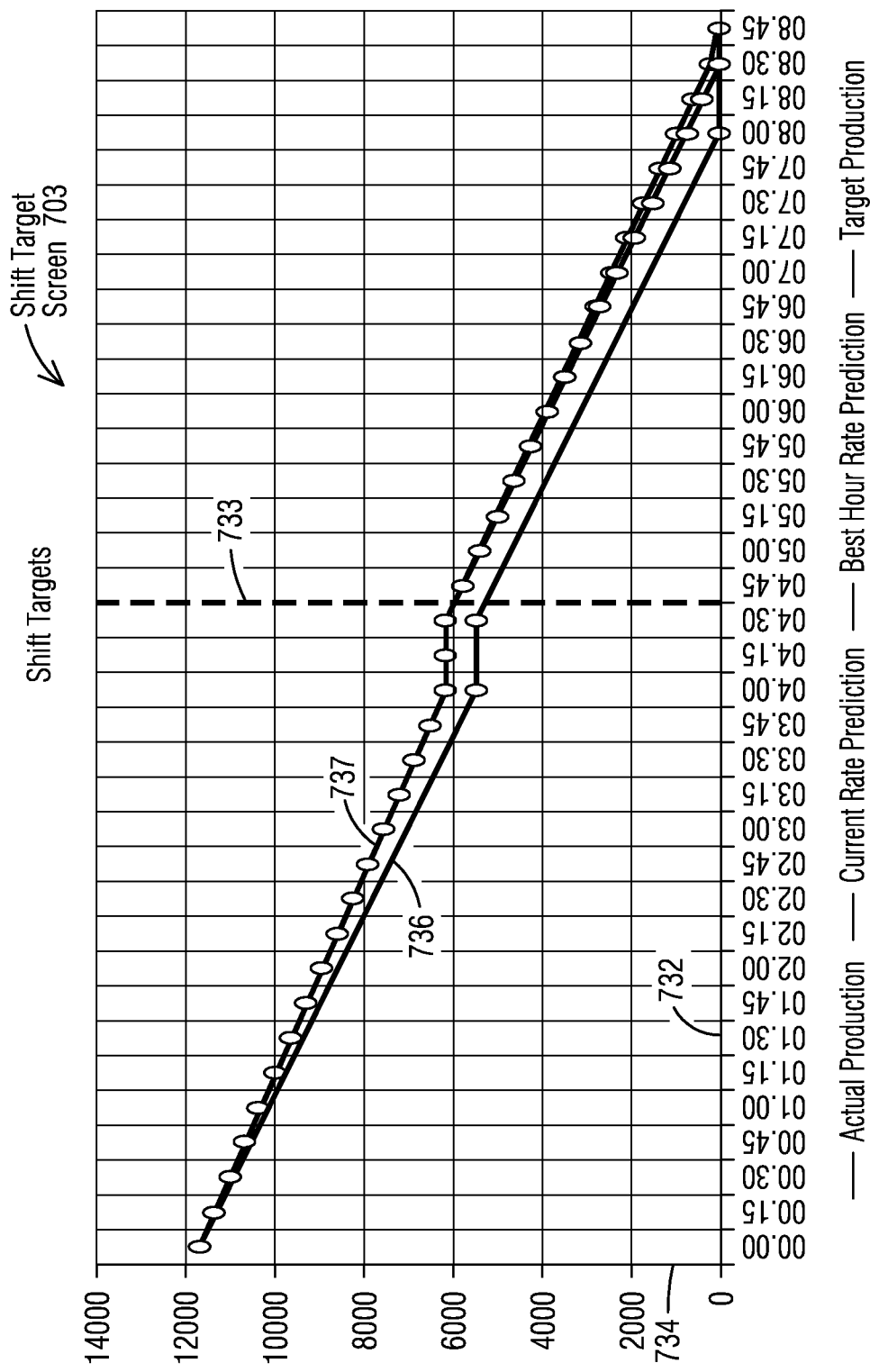

FIG. 7A through FIG. 7B are block diagrams that illustrate example screens for reporting productivity of a production line, according to an embodiment. FIG. 7A is a plant overview graphic for a time interval and site specified in dashboard 500 area 503 and 501, respectively. The site is indicated in area 421. This graphic provides for several production lines, production line status, the SKU they are currently running and all relevant progress towards target data. For each production line at the site, the graphic provides a production line area 710. Each production line area 710 includes: an image of the product in area 711 for the production run; an area 712 that presents text that indicates an identifier for the production line; an area 713 that presents text that indicates current status (e.g., operating at target efficiency for 3 hours, or running at marginal efficiency for 15 minutes, or down for 25 minutes, etc.); an area 714 that labels a time axis in intervals that are based on (e.g., equal to) the start time and time interval in fields 231 and 233, respectively, in a record 210 in the line data structure 200; a bar running parallel to the time axis with different colors representing different status intervals (e.g., color 725 running at or near target efficiency, color 726 running at marginal efficiency or below, and color 727 for down time); an area 715 that presents text that indicates the count in the last hour, the total count since the start time and the target count since the start time; an area 716 that presents text that indicate OEE efficiency, the time behind the target time for the target count during the current shift, and the count behind the target count during the current shift; an area 717 presenting a graphic that indicates trend relative to target with an arrow pointing downward, level or upward; and an area 718 that presents a pie chart that indicates the portion of products produced relative to a target rate and the portion of products missed due to planed downtime and the portion products missed due to unplanned downtime.

FIG. 7B is a graph that traces actual versus planned production as a function of time for a time interval and site specified in dashboard 500 area 503 and 501, respectively. The independent axis 732 indicates time and the dependent axis 734 indicates products yet to be produced to reach target production. Trace 737 indicates actual counts as a function of time; and, trace 736 indicates target counts as a function of time. A planned downtime is evident at times just before current time 733 indicated by the dashed line. Beyond current time the traces indicate projected counts if the production line were to proceed at the target rate, given by the target number divided by the target duration in fields 223 and 225, respectively, in record 210 for the current production run in line data structure 200. This projection can be used to determine the count at the target end time (where trace 736 hits the independent axis), or the end time for the target count (where trace 737 hits the independent axis).

Figure 8:
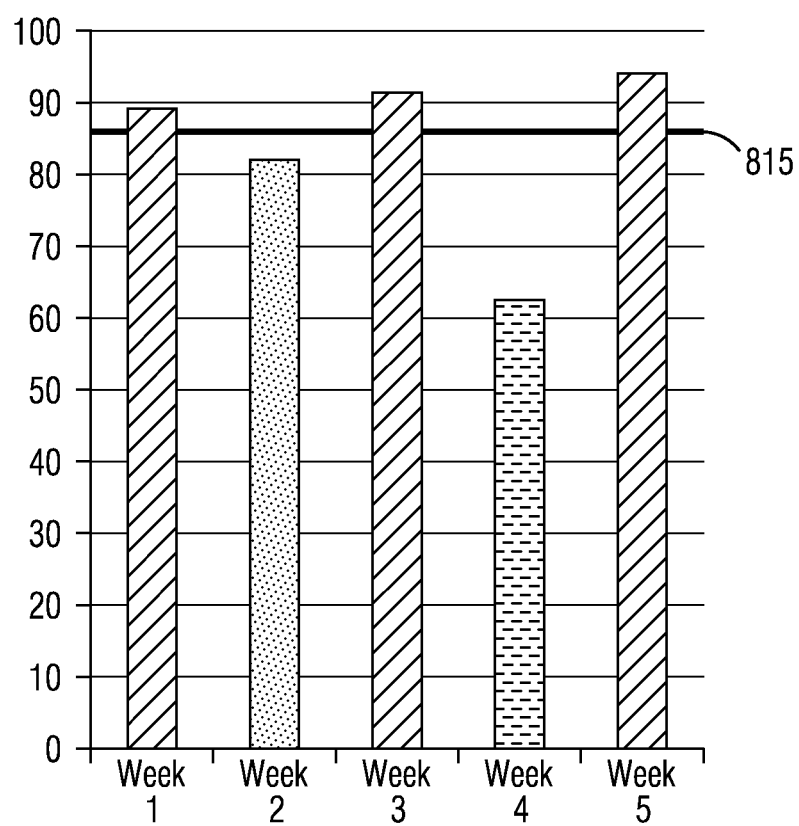
FIG. 8 is a graph that illustrates example content for a panel for reporting productivity of a production line over an extended time period, according to an embodiment.

FIG. 8 is a graph that illustrates example content for a panels for reporting productivity of a production line over an extended time period, according to an embodiment. FIG. 8 is a bar graph that depicts example OEE for a longer time interval than in FIG. 6B and site specified in dashboard 500 area 503 and 501, respectively. The horizontal axis indicates week number for each of 5 weeks, the vertical axis indicates OEE in percent. Weeks 1, 3 and 5 with OEE over 85% are indicated by diagonal hatching. Week 2 with OEE over 80% is indicated by stippled hatching. Week 4 with OEE below 70% is indicated by dashed hatching.

In some embodiments, a user configures downtime codes based on any of the events recorded in the production run record, as described for example below with reference to FIG. 9A. The codes can then be accessed through any device that can connect to the system and durations input on the line or deduced from the timestamps and the number of intervals with zero or minimal counts. As a result, a user can view downtime by amount per time period, or cumulatively by code. FIG. 9A through FIG. 9C are block diagrams that illustrate example screens for reporting downtime for a production line, according to an embodiment.

Figure 9A:
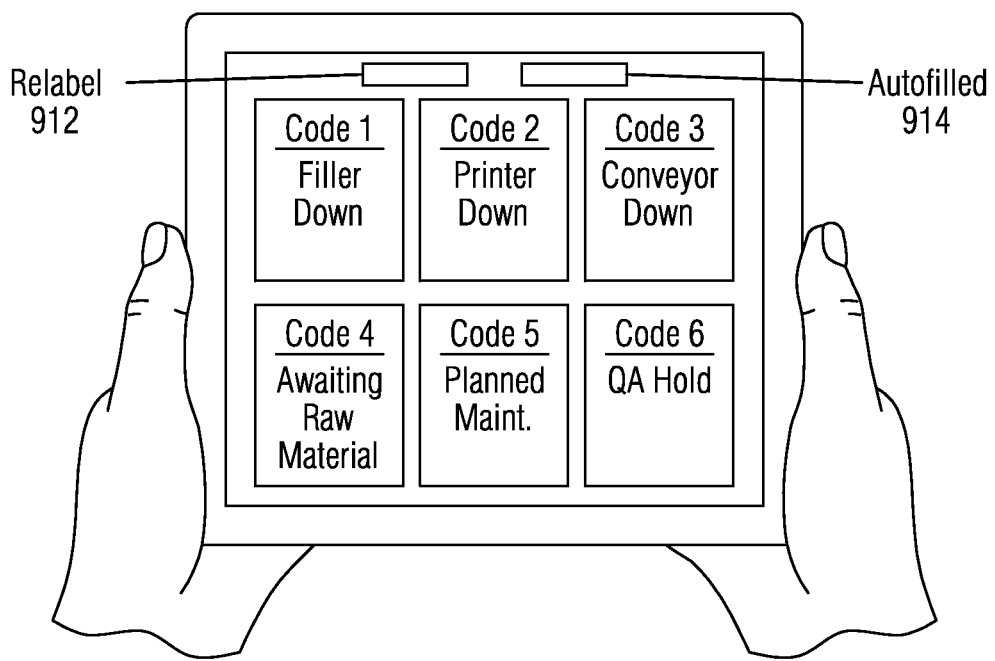
FIG. 9A through FIG. 9C are block diagrams that illustrate example screens for reporting downtime for a production line, according to an embodiment.
Figure 9B:
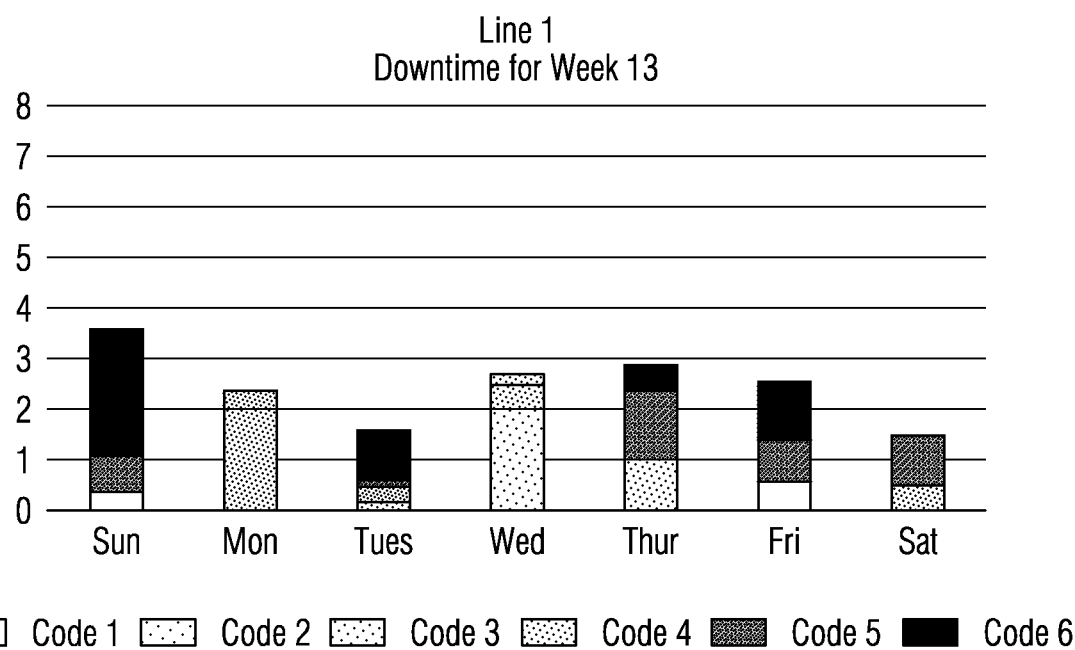
Figure 9C:
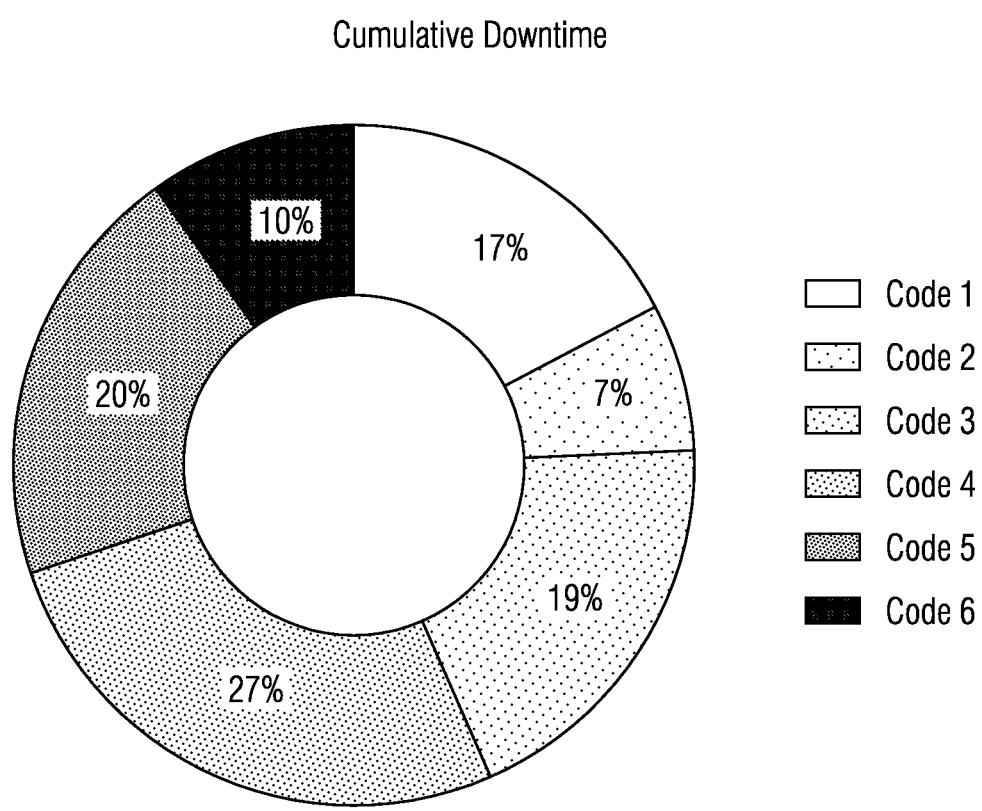

FIG. 9A is an example user interface that is used to define different codes for different events or combination of events. Downtime codes are entered by a user through a phone, tablet or PC, e.g., using a web page or other GUI, e.g., during step 323. The system allows this entry when the machine has been determined to be stopped (no counts during a certain configurable time period). This allows the user to categorize the data; thus, gaining more insight into how to improve operations on the production line. OEE is not changed based on this categorization; as OEE only depends on the total of unplanned downtime. So, for example, when a filler (which puts product into a package) stops, the smart printer subsequently stops printing, the absence of prints is detected, a request is presented to the user, e.g., via webpage, for a code to be entered. The user enters or creates a code for filler down. If the user fails to enter a code, the downtime is captured as uncategorized unplanned downtime. In this example, code 1 indicates filler down; code 2 indicates printer down as a result of any of the smart printer events that lead to printer down; code 3 indicates conveyer down, as inferred by no product coming before the representative printer or a motion detector directed to the convey means; code 4 indicates awaiting raw material, such a liquid that fills a can; code 5 indicates down for planned maintenance as inferred from data in fields 228 and 229; and, code 6 indicates a quality assurance hold as determined by an event recorded in the field 253.

In some embodiments, the interface is provided during step 323, and includes a relabel active area 912 or an autofilled active area 914 or both. A user can use the relabel active area 912 to change downtime from scheduled to unscheduled, or back. In the autofilled active area 914, data is presented, e.g., with an icon, indicating that the event code for the particular downtime that is the subject of the display has been automatically filled based on error codes or conditions automatically generated by a smart printer 110 at the time of the event associated with the current downtime event.

In various embodiments, one or more codes are determined in other automated or automated assist ways. An advantage of these automated or automated assist embodiments is to obtain a downtime code in circumstances where an operator might otherwise skip providing a manual response to a prompt because the operator is focused on returning the production line to operation. For example, in some embodiments, the line productivity module 172 is tied into the programmable logic controller (PLC) on each of one or more components of the production line or a master controller, e.g., by monitoring the communications bus on which such PLC put their current status. In some embodiments, a communication device (not shown) is co-located with a component of the production line. When the operator attends to that component, the operator can also operate the communication device, e.g., using one or more buttons or active areas, in response to which a predetermined downtime code is communicated to the line productivity module 172.

FIG. 9B is a bar graph that indicates codes contributing to downtime for a time interval and site specified in dashboard 500 area 503 and 501, respectively. In the illustrated embodiment the time interval is one week, and the horizontal axis indicates the day of the week. The vertical axis indicates the number of hours attributed to each code. The top of a bar indicates the total downtime, and the portion due to each code is represented by a color. The lowermost section of each bar with a first color indicates code 1, and successively higher sections of each bar with colors 2 through 6 indicate codes 2 through 6.

FIG. 9C is a pie chart with center removed, thus forming an annular or circle chart, which indicates codes contributing to total downtime for a time interval and site specified in dashboard 500 area 503 and 501, respectively. Codes 1 through 6 contribute portions to the annulus in a clockwise direction, accounting for 17%, 7%, 19%, 27%, 20% and 10% of the total downtime, respectively. This kind of information suggests remedial action is best directed to the largest contributors, such as code 4 for waiting for raw material.

FIG. 13A and FIG. 13C are block diagrams that illustrate example screens for reporting product inspections, according to an embodiment. FIG. 13A is a block diagram that illustrates an example screenshot used to configure an unlimited set of inspections. FIG. 13B is a block diagram that illustrates an example screenshot used to receive reminders and complete the inspection on an internet enabled device, such as a table or smartphone. The input received at these screens is stored as an electronic record which can later be searched and produce inspection summary reports.

FIG. 13A illustrates a screen that allows creating an inspection form that would replace a paper form that might be currently used. The system provides this particular "Inspection Set" form a name and provides categories that will be inspected on that form. In addition to instantiating an electronic form, a user can also do one or more of the following from this screen: 1) Assign that Inspection Set to a specific Line or Product (even a line that does have an intelligent printer); 2) Create a cadence, with associated notification, for performing that inspection; or, 3) Input reference data such as "16 oz.+0.5 oz" (not depicted).

FIG. 13B illustrates a screen that presents a completed form that a user would view and use to complete the inspection. An Inspector would go through each item on the form and provide any input, which would indicate either a value or "pass/fail" judgement. Additionally the Inspector could do one or more of the following: 1) View the configured reference data, which could be a value (see above) or an image (e.g., correct label placement); 2) Provide comments which would be most typically used to provide more information on a failed inspection; or, 3) Attach an image for example to capture an incorrect label placement.

Thus, as illustrated by these examples, the system enables one to automate packaging line set-up, extract key performance based data, and turn that data into actionable insight. Thus, the system provides a means for increasing production line productivity, e.g., by identifying downtime causes against which remedial actions are best directed. This is possible through (a) seamless network and remote server connectivity (e.g., cloud connectivity) enabling visibility to entire packaging and other production line operation on a single screen; (b) data visualization prompting managerial insight that enables data driven action; and, (c) equipping front line team members with real time data unlocking ownership, pride and engagement around daily performance The system enables knowing where one is, knowing where one is going to be, and knowing how one goes there (so it doesn't happen again or repeat it). The system provides real time visualization of packaging line and other production line performance, forward looking projections for productivity, and historical trend analysis to ID areas of improvement and best practice.

3. Computational Hardware Overview

Figure 10:
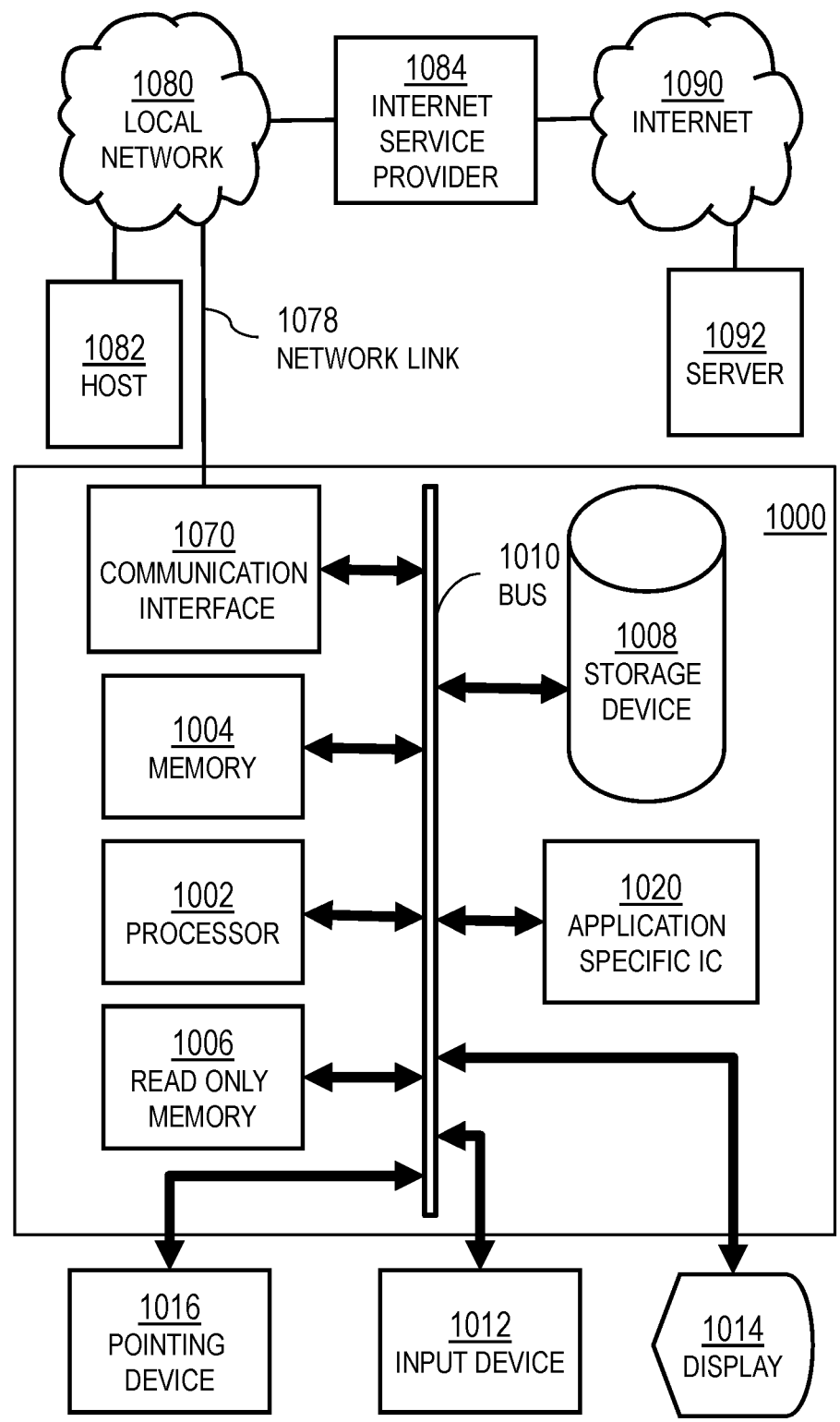
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078, and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
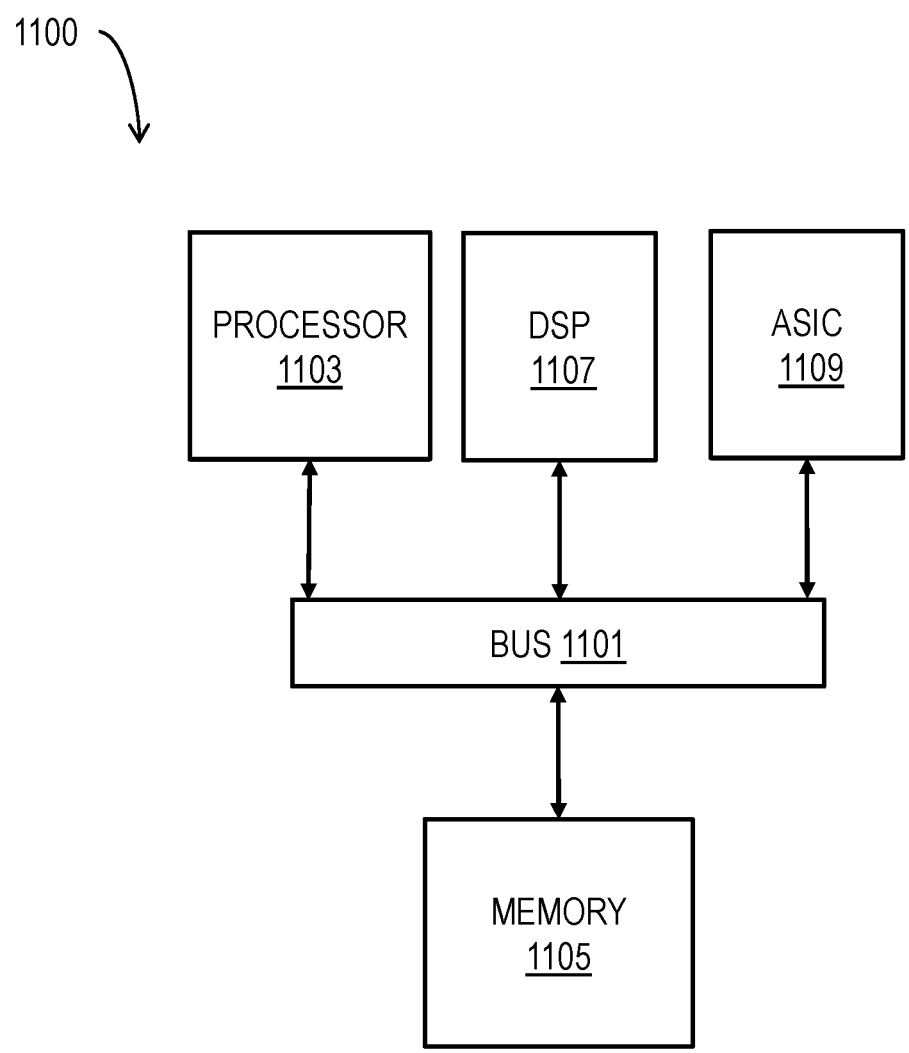
FIG. 11 illustrates a chip set upon which an embodiment of the invention may be implemented.
Figure 12:
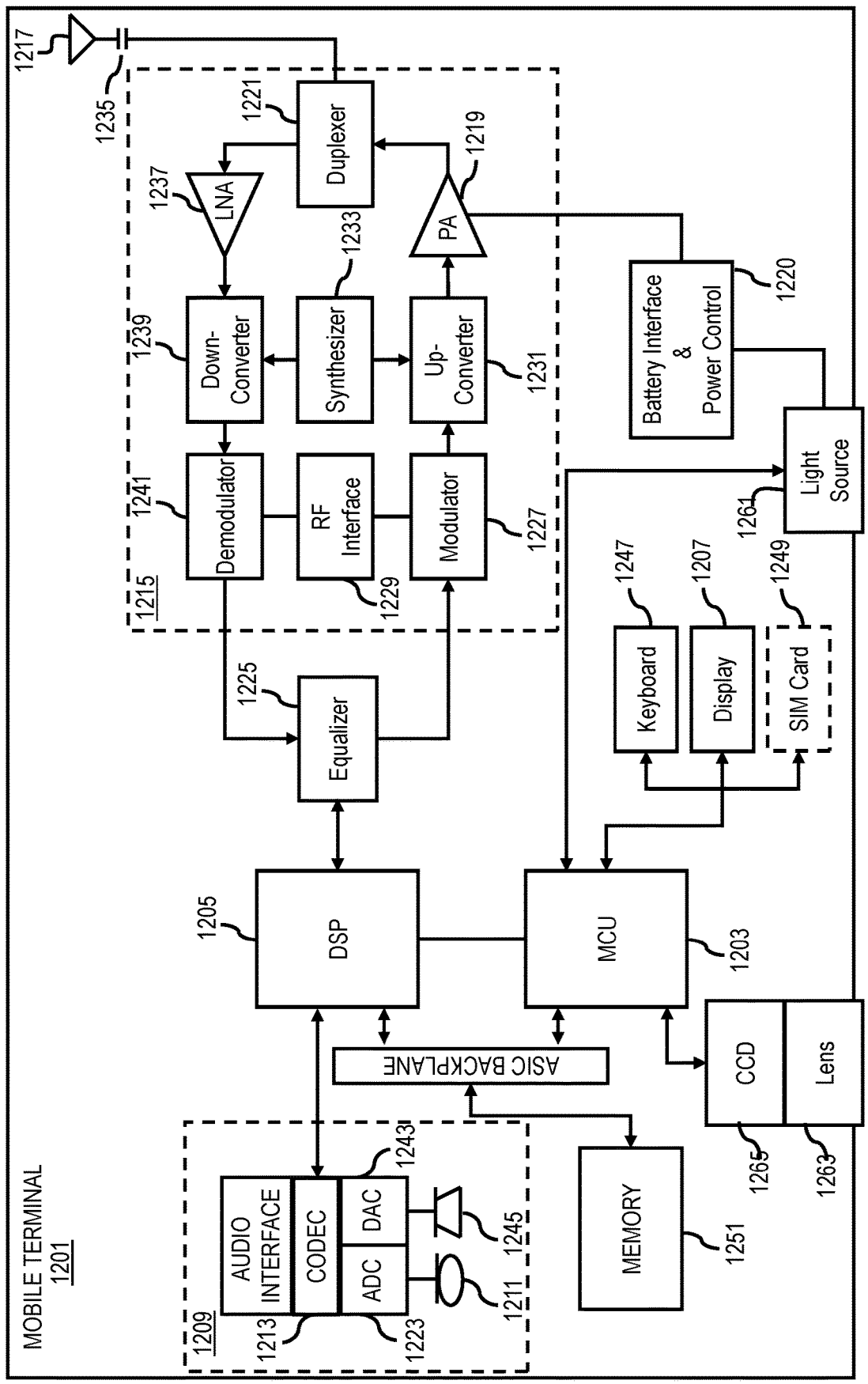
FIG. 12 is a diagram that illustrates example components of a mobile terminal (e.g., handset) for communications, which is capable of operating in the system of FIG. 1A, according to an embodiment.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

FIG. 12 is a diagram of exemplary components of a mobile terminal (e.g., handset) for communications, which is capable of operating in the system of FIG. 1, according to an embodiment. In some embodiments, mobile terminal 1201, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry"

would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps as described herein. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 as described herein. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

In some embodiments, the mobile terminal 1201 includes a digital camera comprising an array of optical detectors, such as charge coupled device (CCD) array 1265. The output of the array is image data that is transferred to the MCU for further processing or storage in the memory 1351 or both. In the illustrated embodiment, the light impinges on the optical array through a lens 1263, such as a pin-hole lens or a material lens made of an optical grade glass or plastic material. In the illustrated embodiment, the mobile terminal 1201 includes a light source 1261, such as a LED to illuminate a subject for capture by the optical array, e.g., CCD 1265. The light source is powered by the battery interface and power control module 1220 and controlled by the MCU 1203 based on instructions stored or loaded into the MCU 1203.

4. Extensions, Modifications and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method implemented on a processor for operating an industrial printer, the method comprising:
   obtaining first data that indicates a representative industrial printer used on a production line at a facility and a product to be output by the production line;
   obtaining second data that comprises a target start time and a target number of the product and a target duration for producing the target number of the product;
   operating the representative industrial printer to report a count of print operations for the product at regular time intervals;
   transmitting, to the processor, third data that comprises the count of print operations and the time interval; and
   upon a condition precedent, determining, with the processor, a line report that comprises productivity of the production line based on the count of print operations and the second data, and presenting the line report on a display device,
   wherein the condition precedent is one or more of a group comprising passage of the target duration after the target start time, passage of the target duration after a first print operation for the product, a change in shift workers on the production line, a time of day, and a predetermined event.

2. The method as recited in claim 1, further comprising presenting a user interface to receive an event code indicating at least one of: filler down; printer down; awaiting product; awaiting raw material; planned maintenance; and, quality assurance hold, wherein the predetermined event includes receiving a report of the event code.

3. The method as recited in claim 1, wherein the processor includes one or more of a group of processors comprising: a processor on the representative industrial printer; a processor on a network confined to the facility; and a processor on a remote server outside the facility.

4. The method as recited in claim 1, wherein:
   the count of print operations is based on a first sensor in the representative printer;
   the method further comprises producing an event code automatically on a processor based on one or more sensors different from the first sensor in at least one of the representative printer or a different printer on the production line;
   the event code indicates a printer condition or event associated with production down time for at least one of the representative printer or the different printer on the production line; and
   the method further comprises storing the third data that includes automatically storing the third data that indicates the event code produced.

5. The method as recited in claim 1, further comprising presenting a user interface configured to receive label input data that indicates a change in a label for observed downtime between a label of scheduled downtime and a label of unscheduled downtime.

6. The method as recited in claim 1, further comprising:
   presenting an inspection user interface configured to receive inspection data based on manual input provided by an inspector; and
   storing automatically on a computer-readable medium the inspection data.

7. The method as recited in claim 1, wherein:
   the method further comprises receiving over communication lines from a separate sensor that is not part of the industrial printer, separate data that indicates a count of products on the production line; and
   the method further comprises storing the third data that includes automatically storing supplemental data based on the separate data from the separate sensor.

8. A non-transitory computer-readable medium carrying one or more sequences of instructions, wherein execution of the one or more sequences of instructions by one or more processors causes the one or more processors to perform the steps of:
   obtaining first data that indicates a representative industrial printer used on a production line at a facility and a product to be output by the production line;
   obtaining second data that comprises a target start time and a target number of the product and a target duration for producing the target number of the product;
   operating the representative industrial printer to report a count of print operations for the product at regular time intervals;
   transmitting, to the processor, third data that comprises the count of print operations and the time interval; and
   upon a condition precedent, determining, with the processor, a line report that indicates productivity of the production line based on the count of print operations and the second data, and presenting the line report on a display device,
   wherein the condition precedent is one or more of a group comprising passage of the target duration after the target start time, passage of the target duration after a first print operation for the product, a change in shift workers on the production line, a time of day, and a predetermined event.

9. The computer-readable medium as recited in claim 8, wherein execution of the one or more sequences of instructions further causes the one or more processors to perform presenting a user interface to receive an event code indicating at least one of: filler down; printer down; awaiting product; awaiting raw material; planned maintenance; and, quality assurance hold, wherein the predetermined event includes receiving a report of the event code.

10. The computer-readable medium as recited in claim 8, wherein the processor includes one or more of a group of processors comprising: a processor on the representative industrial printer; a processor on a network confined to the facility;
and a processor on a remote server outside the facility.

11. The computer-readable medium as recited in claim 8, wherein:
the count of print operations is based on a first sensor in the representative printer;
execution of the one or more sequences of instructions further causes the one or more processors to perform producing an event code automatically on a processor based on one or more sensors different from the first sensor in at least one of the representative printer or a different printer on the production line;
the event code indicates a printer condition or event associated with production down time for at least one of the representative printer or the different printer on the production line; and
execution of the one or more sequences of instructions further causes the one or more processors to perform storing the third data that includes automatically storing the third data that indicates the event code produced.

12. The computer-readable medium as recited in claim 8, wherein execution of the one or more sequences of instructions further causes the one or more processors to perform presenting a user interface configured to receive label input data that indicates a change in a label for observed downtime between a label of scheduled downtime and a label of unscheduled downtime.

13. The computer-readable medium as recited in claim 8, wherein execution of the one or more sequences of instructions further causes the one or more processors to perform:
presenting an inspection user interface configured to receive inspection data based on manual input provided by an inspector; and
storing automatically on a computer-readable medium the inspection data.

14. The computer-readable medium as recited in claim 8, wherein:
execution of the one or more sequences of instructions further causes the one or more processors to perform receiving over communication lines from a separate sensor that is not part of the industrial printer, separate data that indicates a count of products on the production line; and
execution of the one or more sequences of instructions further causes the one or more processors to perform storing the third data that includes automatically storing supplemental data based on the separate data from the separate sensor.

15. An apparatus comprising:
at least one processor; and
at least one memory including one or more sequences of instructions,
the at least one memory and the one or more sequences of instructions configured to, with the at least one processor, cause the apparatus to perform at least the following,
obtain first data that indicates a representative industrial printer used on a production line at a facility and a product to be output by the production line;
obtain second data that comprises a target start time and a target number of the product and a target duration for producing the target number of the product;
operate the representative industrial printer to report a count of print operations for the product at regular time intervals;
transmit third data to the at least one processor that comprises the count of print operations and the time interval; and
upon a condition precedent, determine with the at least one processor a line report that comprises productivity of the production line based on the count of print operations and the second data, and presenting the line report on a display device,
wherein the condition precedent is one or more of a group comprising passage of the target duration after the target start time, passage of the target duration after a first print operation for the product, a change in shift workers on the production line, a time of day, and a predetermined event.

16. A system comprising:
a production line at a facility;
a processor;
a display device;
an industrial printer configured to label a package on the production line, the industrial printer in communication with the processor;
at least one memory including one or more sequences of instructions,
the at least one memory and the one or more sequences of instructions configured to, with the at least one processor, cause the system to perform at least the following:
operate the representative industrial printer to report a count of print operations for the product at a plurality of time intervals;
obtain first data that indicates the industrial printer and a product to be output by the product line;
obtain second data that comprises a target start time and a target number of the product and a target duration for producing the target number of the product;
transmit to the processor data that comprises the count of print operations and the plurality of time intervals; and
upon a condition precedent,
determine with the processor a line report that comprises productivity of the production line based at least in part on the count of print operations and the second data, and
present the line report on the display device.

17. A system as recited in claim 16, wherein the condition precedent is one or more of a group comprising passage of the target duration after the target start time, passage of the target duration after a first print operation for the product, a change in shift workers on the production line, a time of day, and a predetermined event.

18. The system as recited in claim 17, wherein execution of the one or more sequences of instructions further causes the one or more processors to perform presenting a user interface to receive an event code indicating at least one of: filler down; printer down; awaiting product; awaiting raw material; planned maintenance; and, quality assurance hold, wherein the predetermined event includes receiving a report of the event code.

19. The system as recited in claim 16, wherein the processor includes one or more of a group of processors comprising: a processor on the representative industrial printer; a processor on a network confined to the facility; and a processor on a remote server outside the facility.

20. The system as recited in claim 16, wherein:
the count of print operations is based on a first sensor in the representative printer;
execution of the one or more sequences of instructions further causes the one or more processors to perform:
producing an event code automatically on a processor based on one or more sensors different from the first sensor in at least one of the representative printer or a different printer on the production line; and
storing in the at least one memory third data that comprises the event code produced; and,
the event code indicates a printer condition or event associated with production down time for at least one of the representative printer or the different printer on the production line.

21. The system as recited in claim 16, wherein execution of the one or more sequences of instructions further causes the one or more processors to perform presenting a user interface configured to receive label input data that indicates a change in a label for observed downtime between a label of scheduled downtime and a label of unscheduled downtime.

22. The system as recited in claim 16, wherein execution of the one or more sequences of instructions further causes the one or more processors to perform:
presenting an inspection user interface configured to receive inspection data based on manual input provided by an inspector; and
storing automatically on a computer-readable medium the inspection data.

23. The system as recited in claim 16, wherein execution of the one or more sequences of instructions further causes the one or more processors to perform:
receiving over communication lines from a separate sensor that is not part of the industrial printer, separate data that indicates a count of products on the production line; and
automatically storing in the one or more memory supplemental data based on the separate data from the separate sensor.

* * * * *